US009150118B2

(12) United States Patent
Shinohara et al.

(10) Patent No.: US 9,150,118 B2
(45) Date of Patent: Oct. 6, 2015

(54) VEHICLE DRIVING SYSTEM AND VEHICLE DRIVING SYSTEM CONTROL METHOD

(71) Applicant: HONDA MOTOR CO., LTD., Tokyo (JP)

(72) Inventors: Sei Shinohara, Wako (JP); Satoshi Ando, Wako (JP); Masatoshi Noguchi, Wako (JP); Masakatsu Hori, Wako (JP); Makoto Tsuchihashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/384,043

(22) PCT Filed: Mar. 19, 2013

(86) PCT No.: PCT/JP2013/057895
§ 371 (c)(1),
(2) Date: Sep. 9, 2014

(87) PCT Pub. No.: WO2013/141259
PCT Pub. Date: Sep. 26, 2013

(65) Prior Publication Data
US 2015/0042245 A1 Feb. 12, 2015

(30) Foreign Application Priority Data

Mar. 21, 2012 (JP) .................................. 2012-064075

(51) Int. Cl.
*B61C 15/08* (2006.01)
*B60L 15/20* (2006.01)
(Continued)

(52) U.S. Cl.
CPC .............. *B60L 15/2036* (2013.01); *B60K 1/02* (2013.01); *B60K 6/52* (2013.01); *B60K 7/0007* (2013.01);
(Continued)

(58) Field of Classification Search
CPC ............ B60W 10/00; B60W 2300/00; B60W 2400/00; B60L 2200/00; B60L 2210/00
See application file for complete search history.

(56) References Cited

U.S. PATENT DOCUMENTS

| 5,599,075 A | * | 2/1997 | Hara et al. | ..................... | 303/143 |
| 2007/0249456 A1 | * | 10/2007 | Meixner | ....................... | 475/150 |

(Continued)

FOREIGN PATENT DOCUMENTS

| JP | 3138799 B2 | 2/2001 |
| JP | 2010-130828 A | 6/2010 |

(Continued)

OTHER PUBLICATIONS

International Search Report dated Jun. 25, 2013 issued in corresponding application No. PCT/JP2013/057895.

*Primary Examiner* — Shawki S Ismail
*Assistant Examiner* — Zoheb Imtiaz
(74) *Attorney, Agent, or Firm* — Westerman, Hattori, Daniels & Adrian, LLP

(57) ABSTRACT

A motor controller obtains: a first motor target rotation number, a first motor actual rotation number of a first motor, a second motor target rotation number, and a second motor actual rotation number of a second motor; determines a first rotation number difference between the first motor target rotation number and the first motor actual rotation number of the first motor, and a second rotation number difference between the second motor target rotation number and the second motor actual rotation number of the second motor, determines first and second rotation control torques based on a smaller one of the first rotation number difference and the second rotation number difference; and determines a first motor torque of the first motor and a second motor torque of the second motor based on the first and second rotation control torques.

20 Claims, 20 Drawing Sheets

(51) Int. Cl.
  *B60L 7/12* (2006.01)
  *B60L 7/26* (2006.01)
  *B60L 11/12* (2006.01)
  *B60L 11/14* (2006.01)
  *B60L 11/18* (2006.01)
  *B60K 1/02* (2006.01)
  *B60K 7/00* (2006.01)
  *B60K 17/04* (2006.01)
  *B60K 23/06* (2006.01)
  *B60K 6/52* (2007.10)
  *B60W 10/08* (2006.01)

(52) U.S. Cl.
  CPC ............... *B60K 17/046* (2013.01); *B60K 23/06* (2013.01); *B60L 7/12* (2013.01); *B60L 7/26* (2013.01); *B60L 11/123* (2013.01); *B60L 11/14* (2013.01); *B60L 11/1861* (2013.01); *B60L 15/2009* (2013.01); *B60W 10/08* (2013.01); *B60L 2220/46* (2013.01); *B60L 2240/12* (2013.01); *B60L 2240/421* (2013.01); *B60L 2240/423* (2013.01); *B60L 2240/486* (2013.01); *B60L 2250/26* (2013.01); *B60L 2270/145* (2013.01); *B60W 2710/081* (2013.01); *B60W 2710/083* (2013.01); *Y02T 10/6217* (2013.01); *Y02T 10/642* (2013.01); *Y02T 10/705* (2013.01); *Y02T 10/7005* (2013.01); *Y02T 10/7044* (2013.01); *Y02T 10/7077* (2013.01); *Y02T 10/7275* (2013.01)

(56) References Cited

U.S. PATENT DOCUMENTS

| | | | |
|---|---|---|---|
| 2009/0043474 A1* | 2/2009 | Nakai et al. | 701/70 |
| 2012/0143426 A1* | 6/2012 | Yamamoto et al. | 701/22 |
| 2012/0271496 A1* | 10/2012 | Yamamoto | 701/22 |
| 2013/0165293 A1 | 6/2013 | Shinohara et al. | |
| 2013/0289838 A1* | 10/2013 | Mori et al. | 701/51 |

FOREIGN PATENT DOCUMENTS

| | | |
|---|---|---|
| JP | 2011-31742 A | 2/2011 |
| JP | 2011-31746 A | 2/2011 |
| JP | 2012-224184 A | 11/2012 |
| JP | 2013-147237 A | 8/2013 |

* cited by examiner

| VEHICLE STATE | FRONT UNIT | REAR UNIT | REAR MOTOR | OWC | BRK |
|---|---|---|---|---|---|
| STOPPED | × | × | STOP | OFF | OFF |
| FORWARD TRAVEL AT LOW VEHICLE SPEEDS | × | ○ | DRIVING BASED ON POWER RUNNING | ON | ON (WEAKLY APPLIED) |
| FORWARD TRAVEL AT MIDDLE VEHICLE SPEEDS | ○ | × | STOP | OFF | ON (WEAKLY APPLIED) |
| REGENERATIVE DECELERATION | ○ | ○ | REGENERATIVE DRIVING | OFF | ON |
| ACCELERATION | ○ | ○ | DRIVING BASED ON POWER RUNNING | ON | ON (WEAKLY APPLIED) |
| FORWARD TRAVEL AT HIGH VEHICLE SPEEDS (WITHOUT DRIVE REQUEST) | ○ | × | STOP | OFF | OFF |
| FORWARD TRAVEL AT HIGH VEHICLE SPEEDS (WITH DRIVE REQUEST) | ○ | RING FREE CONTROL | DRIVING BASED ON POWER RUNNING | OFF | OFF |
| REVERSED | × | ○ | REVERSE DRIVING BASED ON POWER RUNNING | OFF | ON |

*FIG. 4*

VEHICLE DRIVING SYSTEM AND VEHICLE DRIVING SYSTEM CONTROL METHOD

TECHNICAL FIELD

The present invention relates to a vehicle driving system which includes a left wheel driving system which drives a left wheel and a right wheel driving system which drives a right wheel, and a vehicle driving system control method.

BACKGROUND ART

Patent Literature 1 describes a vehicle driving system which includes a left wheel driving system having a first motor which drives a left wheel of a vehicle and a first planetary gear type speed changer which is provided on a power transmission path between the first motor and the left wheel, and a right wheel driving system having a second motor which drives a right wheel of the vehicle and a second planetary gear type speed changer which is provided on a power transmission path between the second motor and the right wheel. In the first and second planetary gear type speed changers, the first and second motors are connected to corresponding sun gears, the left wheel and the right wheel are connected to corresponding planetary carriers, and ring gears are connected to each other. Additionally, the vehicle driving system includes brake units which control the rotations of the ring gears by releasing or applying the connected ring gear.

In the vehicle driving system configured in this way, it is described that a start assist control is performed at the time of start of the vehicle by applying the brake units. Further, it is described that with the brake units released after the start of the vehicle, a torque control is performed so that torques generated in the first and second motors act in opposite directions, whereby even though a yaw moment is exerted on the vehicle due to disturbance or the like, a moment opposing to the yaw moment is produced so as to improve the straight line stability or the turning stability.

RELATED ART REFERENCES

Patent Literature

Patent Literature 1: JP 3138799 B2

SUMMARY OF THE INVENTION

Problem that the Invention is to Solve

In recent years, there have been strong demands for energy saving and improved fuel economy, as well as for improved driving comfort. In the vehicle driving system described in Patent Literature 1, too, there has been room for improvement in controllability.

The invention has been made in view of these problems, and an object thereof is to provide a vehicle driving system having good controllability and a vehicle driving system control method.

Means for Solving the Problem

In order to achieve the above-mentioned object, the first aspect of the present application is characterized by a vehicle driving system (e.g., a rear wheel driving system 1 in embodiment) including:

a left wheel driving system having: a first motor (e.g., a first motor 2A in embodiment) which drives a left wheel (e.g., a left rear wheel LWr in embodiment) of a vehicle; and a first speed changer (e.g., a first planetary type speed reducer 12A in embodiment) which is provided on a power transmission path between the first motor and the left wheel;

a right wheel driving system having: a second motor (e.g., a second motor 2B in embodiment) which drives a right wheel (e.g., a right rear wheel RWr in embodiment) of the vehicle; and a second speed changer (e.g., a second planetary gear type speed reducer 12B) which is provided on a power transmission path between the second motor and the right wheel; and a motor controller (e.g., a controller 8 in embodiment) which controls the first motor and the second motor, wherein:

the first and the second speed changers each has first to third rotational elements;

the first motor is connected to the first rotational element (e.g., a sun gear 21A in embodiment) of the first speed changer;

the second motor is connected to the first rotational element (e.g., a sun gear 21B in embodiment) of the second speed changer;

the left wheel is connected to the second rotational element (e.g., a planetary carrier 23A in embodiment) of the first speed changer;

the right wheel is connected to the second rotational element (e.g., a planetary carrier 23B in embodiment) of the second speed changer;

the third rotational element (e.g., a ring gear 24A in embodiment) of the first speed changer and the third rotational element (e.g., a ring gear 24B in embodiment) of the second speed changer are connected to each other; and the motor controller:

obtains a target rotation state quantity (e.g., a first motor target rotation number MA2 in embodiment) of the first motor, an actual rotation state quantity (e.g., a first motor actual rotation number MA1 in embodiment) of the first motor, a target rotation state quantity (e.g., a second motor target rotation number MB2 in embodiment) of the second motor, and an actual rotation state quantity (e.g., a second motor actual rotation number MB1 in embodiment) of the second motor;

determines a first rotation state quantity difference (e.g., a first rotation number difference DA in embodiment) which is a rotation state quantity difference between the target rotation state quantity of the first motor and the actual rotation state quantity of the first motor, and a second rotation state quantity difference (e.g., a second rotation number difference DB in embodiment) which is a rotation state quantity difference between the target rotation state quantity of the second motor and the actual rotation state quantity of the second motor;

determines a rotation state quantity control torque (e.g., a first rotation control torque SM1, a second rotation control torque SM2 in embodiment) based on a smaller one of the first rotation state quantity difference and the second rotation state quantity difference; and determines a control torque (e.g., a first motor torque M1 in embodiment) of the first motor and a control torque (e.g., a second motor torque M2 in embodiment) of the second motor based on the rotation state quantity control torque.

In order to achieve the above-mentioned object, the second aspect is characterized by a vehicle driving system (e.g., a rear wheel driving system 1 in embodiment) including:

a left wheel driving system having: a first motor (e.g., a first motor 2A in embodiment) which drives a left wheel (e.g., a left rear wheel LWr in embodiment) of a vehicle; and a first speed changer (e.g., a first planetary type speed reducer 12A in embodiment) which is provided on a power transmission path between the first motor and the left wheel;

a right wheel driving system having: a second motor (e.g., a second motor 2B in embodiment) which drives a right wheel (e.g., a right rear wheel RWr in embodiment) of the vehicle; and a second speed changer (e.g., a second planetary gear type speed reducer 12B) which is provided on a power transmission path between the second motor and the right wheel; and a motor controller (e.g., a controller 8 in embodiment) which controls the first motor and the second motor, wherein:

the first and the second speed changers each has first to third rotational elements;

the first motor is connected to the first rotational element (e.g., a sun gear 21A in embodiment) of the first speed changer;

the second motor is connected to the first rotational element (e.g., a sun gear 21B in embodiment) of the second speed changer;

the left wheel is connected to the second rotational element (e.g., a planetary carrier 23A in embodiment) of the first speed changer;

the right wheel is connected to the second rotational element (e.g., a planetary carrier 23B in embodiment) of the second speed changer;

the third rotational element (e.g., a ring gear 24A in embodiment) of the first speed changer and the third rotational element (e.g., a ring gear 24B in embodiment) of the second speed changer are connected to each other; and the motor controller:

obtains a target rotation state quantity (e.g., a first motor target rotation number MA2 in embodiment) of the first motor, an actual rotation state quantity (e.g., a first motor actual rotation number MA1 in embodiment) of the first motor, a target rotation state quantity (e.g., a second motor target rotation number MB2 in embodiment) of the second motor, and an actual rotation state quantity (e.g., a second motor actual rotation number MB1 in embodiment) of the second motor;

determines a first rotation state quantity difference (e.g., a first rotation number difference DA in embodiment) which is a rotation state quantity difference between the target rotation state quantity of the first motor and the actual rotation state quantity of the first motor, and a second rotation state quantity difference (e.g., a second rotation number difference DB in embodiment) which is a rotation state quantity difference between the target rotation state quantity of the second motor and the actual rotation state quantity of the second motor;

determines a first rotation state quantity control torque (e.g., a first rotation control candidate torque in embodiment) based on the first rotation state quantity difference;

determines a second rotation state quantity control torque (e.g., a second rotation control candidate torque in embodiment) based on the second rotation state quantity difference; and determines a control torque (e.g., a first motor torque M1 in embodiment) of the first motor and a control torque (e.g., a second motor torque M2 in embodiment) of the second motor based on a smaller one of the first rotation state quantity control torque and the second rotation state quantity control torque.

In order to achieve the above-mentioned object, the third aspect is characterized by a vehicle driving system (e.g., a rear wheel driving system 1 in embodiment) including:

a left wheel driving system having: a first motor (e.g., a first motor 2A in embodiment) which drives a left wheel (e.g., a left rear wheel LWr in embodiment) of a vehicle; and a first speed changer (e.g., a first planetary type speed reducer 12A in embodiment) which is provided on a power transmission path between the first motor and the left wheel, a right wheel driving system having: a second motor (e.g., a second motor 2B in embodiment) which drives a right wheel (e.g., a right rear wheel RWr in embodiment) of the vehicle; and a second speed changer (e.g., a second planetary gear type speed reducer 12B) which is provided on a power transmission path between the second motor and the right wheel; and a motor controller (e.g., a controller 8 in embodiment) which controls the first motor and the second motor, wherein:

the first and the second speed changers each has a first to third rotational elements;

the first motor is connected to the first rotational element (e.g., a sun gear 21A in embodiment) of the first speed changer;

the second motor is connected to the first rotational element (e.g., a sun gear 21B in embodiment) of the second speed changer;

the left wheel is connected to the second rotational element (e.g., a planetary carrier 23A in embodiment) of the first speed changer;

the right wheel is connected to the second rotational element (e.g., a planetary carrier 23B in embodiment) of the second speed changer;

the third rotational element (e.g., a ring gear 24A in embodiment) of the first speed changer and the third rotational element (e.g., a ring gear 24B in embodiment) of the second speed changer are connected to each other; and the motor controller:

obtains a target rotation state quantity (e.g., a first motor target rotation number MA2 in embodiment) and an actual rotation state quantity (e.g., a first motor actual rotation number MA1 in embodiment) of one of the first motor and the second motor, determines a rotation state quantity difference (e.g., a first rotation number difference DA in embodiment) which is a rotation state quantity difference between the target rotation state quantity and the actual rotation state quantity;

determines a rotation state quantity control torque (e.g., a first rotation control torque SM1 in embodiment) based on the rotation state quantity difference; and determines a control torque (e.g., a first motor torque M1 in embodiment) of the first motor and a control torque (e.g., a second motor torque M2 in embodiment) of the second motor based on the rotation state quantity control torque.

Further, the fourth aspect is characterized in that, in addition to the configuration according to any one of the first to third aspects, the target rotation state quantity of the first motor or the second motor is determined based on at least one of an efficiency of the motor and an efficiency of an electric power supply unit which supplies electric power to the motor.

Further, the the fifth aspect is characterized in that, in addition to the configuration according to any one of the first to third aspects, the target rotation state quantity of the first motor or the second motor is determined based on a target rotation state quantity (e.g., a ring gear target rotation number in embodiment) of the third rotational elements.

Further, the sixth aspect is characterized in that, in addition to the configuration according to the fifth aspect, the vehicle driving system includes at least one of a bidirectional rotation restricting unit (e.g., hydraulic brakes 60A, 60B in embodiment) which can be released or applied and which restricts a rotation of the third rotational elements in both directions by being applied, and a unidirectional rotation restricting unit (e.g., a one-way clutch 50 in embodiment) which permits a rotation of the third rotational elements in one direction when it is disengaged and which restricts a rotation of the third rotational element in the other direction when it is engaged, wherein when the third rotational elements are rotating, the target rotation state quantity of the third rotational elements is set so that the third rotational elements become a substantially zero rotating state.

Further, the seventh aspect is characterized in that, in addition to the configuration according to any one of the first to third aspects:

the first and the second speed changers each has a fourth rotational element (e.g., planetary gears 22A, 22B in embodiment) which is supported by the second rotational element to be capable of revolving and which meshes with the first rotational element and the third rotational element; and the target rotation state quantity of the first motor or the second motor is determined based on a target rotation state quantity (e.g., a planetary gear target rotation number in embodiment) of the fourth rotational element.

Further, the eighth aspect is characterized in that, in addition to the configuration according to the seventh aspect, the target rotation state quantity of the fourth rotational element is set so that a rotational direction of the fourth rotational element which is rotating in one direction or the other direction is not reversed.

Further, the ninth aspect is characterized in that, in addition to the configuration according to any one of the fourth to seventh aspects, the target rotation state quantity of the first motor or the second motor is determined further based on an actual rotation state quantity of the second rotational element, or an actual rotation state quantity of the left wheel or the right wheel.

Further, the tenth aspect is characterized in that, in addition to the configuration according to any one of the first to ninth aspects:

target torque state quantities (e.g., a target motor base torque TTM1, a target motor base torque TTM2 in embodiment) of the first motor and the second motor are determined based on a target turning state quantity (e.g., a target yaw moment YMT in embodiment) of the vehicle;

a torque state quantity control torque (e.g., a first motor base torque TM1 in embodiment) of the first motor is determined based on the target torque state quantity of the first motor;

a torque state quantity control torque (e.g., a second motor base torque TM2 in embodiment) of the second motor is determined based on the target torque state quantity of the second motor; and the control torque of the first motor and the control torque of the second motor are determined further based on the torque state quantity control torque of the first motor and the torque state quantity control torque of the second motor.

Further, the eleventh aspect is characterized in that, in addition to the configuration according to the tenth aspect:

target torque state quantity difference (e.g., a target torque difference ΔTT in embodiment) between the first motor and the second motor is determined based on the target turning state quantity of the vehicle;

one of the target torque state quantity of the first motor and the target torque state quantity of the second motor is determined as a torque state quantity which is half the target torque state quantity difference in magnitude and which has a positive sign; and the other one of the target torque state quantity of the first motor and the target torque state quantity of the second motor is determined as a torque state quantity which is half the target torque state quantity difference in magnitude and which has a negative sign.

In order to achieve the above-mentioned object, the twelfth aspect is characterized by a control method for a vehicle driving system (e.g., a rear wheel driving system 1 in embodiment), the vehicle driving system including:

a left wheel driving system having: a first motor (e.g., a first motor 2A in embodiment) which drives a left wheel (e.g., a left rear wheel LWr in embodiment) of a vehicle; and a first speed changer (e.g., a first planetary type speed reducer 12A in embodiment) which is provided on a power transmission path between the first motor and the left wheel;

a right wheel driving system having: a second motor (e.g., a second motor 2B in embodiment) which drives a right wheel (e.g., a right rear wheel RWr in embodiment) of the vehicle; and a second speed changer (e.g., a second planetary gear type speed reducer 12B) which is provided on a power transmission path between the second motor and the right wheel; and a motor controller (e.g., a controller 8 in embodiment) which controls the first motor and the second motor, wherein:

the first and the second speed changers each has a first to third rotational elements;

the first motor is connected to the first rotational element (e.g., a sun gear 21A in embodiment) of the first speed changer;

the second motor is connected to the first rotational element (e.g., a sun gear 21B in embodiment) of the second speed changer;

the left wheel is connected to the second rotational element (e.g., a planetary carrier 23A in embodiment) of the first speed changer;

the right wheel is connected to the second rotational element (e.g., a planetary carrier 23B in embodiment) of the second speed changer; and the third rotational element (e.g., a ring gear 24A in embodiment) of the first speed changer and the third rotational element (e.g., a ring gear 24B in embodiment) of the second speed changer are connected to each other, the control method including:

a process of obtaining a target rotation state quantity (e.g., a first motor target rotation number MA2 in embodiment) of the first motor, an actual rotation state quantity (e.g., a first motor actual rotation number MA1 in embodiment) of the first motor, a target rotation state quantity (e.g., a second motor target rotation number MB2 in embodiment) of the second motor, and an actual rotation state quantity (e.g., a second motor actual rotation number MB1 in embodiment) of the second motor;

a process of determining a first rotation state quantity difference (e.g., a first rotation number difference DA in embodiment) which is a rotation state quantity difference between the target rotation state quantity of the first motor and the actual rotation state quantity of the first motor, and a second rotation state quantity difference (e.g., a second rotation number difference DB in embodiment) which is a rotation state quantity difference between the target rotation state quantity of the second motor and the actual rotation state quantity of the second motor;

a process of determining a rotation state quantity control torque (e.g., a first rotation control torque SM1, a second rotation control torque SM2 in embodiment) based on a smaller one of the first rotation state quantity difference and the second rotation state quantity difference; and a process of determining a control torque (e.g., a first motor torque M1 in embodiment) of the first motor and a control torque (e.g., a second motor torque M2 in embodiment) of the second motor based on the rotation state quantity control torque.

In order to achieve the above-mentioned object, the thirteenth aspect is characterized by a control method for a vehicle driving system (e.g., a rear wheel driving system 1 in embodiment), the vehicle driving system including:

a left wheel driving system having: a first motor (e.g., a first motor 2A in embodiment) which drives a left wheel (e.g., a left rear wheel LWr in embodiment) of a vehicle; and a first speed changer (e.g., a first planetary type speed reducer 12A in embodiment) which is provided on a power transmission path between the first motor and the left wheel, a right wheel driving system having: a second motor (e.g., a second motor 2B in embodiment) which drives a right wheel (e.g., a right rear wheel RWr in embodiment) of the vehicle; and a second speed changer (e.g., a second planetary gear type speed reducer 12B) which is provided on a power transmission path between the second motor and the right wheel; and a motor controller (e.g., a controller 8 in embodiment) which controls the first motor and the second motor, wherein:

the first and the second speed changers each has a first to third rotational elements;

the first motor is connected to the first rotational element (e.g., a sun gear 21A in embodiment) of the first speed changer;

the second motor is connected to the first rotational element (e.g., a sun gear 21B in embodiment) of the second speed changer;

the left wheel is connected to the second rotational element (e.g., a planetary carrier 23A in embodiment) of the first speed changer;

the right wheel is connected to the second rotational element (e.g., a planetary carrier 23B in embodiment) of the second speed changer; and the third rotational element (e.g., a ring gear 24A in embodiment) of the first speed changer and the third rotational element (e.g., a ring gear 24B in embodiment) of the second speed changer are connected to each other, the control method including:

a process of obtaining a target rotation state quantity (e.g., a first motor target rotation number MA2 in embodiment) of the first motor, an actual rotation state quantity (e.g., a first motor actual rotation number MA1 in embodiment) of the first motor, a target rotation state quantity (e.g., a second motor target rotation number MB2 in embodiment) of the second motor, and an actual rotation state quantity (e.g., a second motor actual rotation number MB1 in embodiment) of the second motor;

a process of determining a first rotation state quantity difference (e.g., a first rotation number difference DA in embodiment) which is a rotation state quantity difference between the target rotation state quantity of the first motor and the actual rotation state quantity of the first motor, and a second rotation state quantity difference (e.g., a second rotation number difference DB in embodiment) which is a rotation state quantity difference between the target rotation state quantity of the second motor and the actual rotation state quantity of the second motor;

a process of determining a first rotation state quantity control torque (e.g., a first rotation control candidate torque in embodiment) based on the first rotation state quantity difference, and determining a second rotation state quantity control torque (e.g., a second rotation control candidate torque in embodiment) based on the second rotation state quantity difference; and a process of determining a control torque (e.g., a first motor torque M1 in embodiment) of the first motor and a control torque (e.g., a second motor torque M2 in embodiment) of the second motor based on a smaller one of the first rotation state quantity control torque and the second rotation state quantity control torque.

In order to achieve the above-mentioned object, the fourteenth aspect is characterized by a control method for a vehicle driving system (e.g., a rear wheel driving system 1 in embodiment), the vehicle driving system including:

a left wheel driving system having: a first motor (e.g., a first motor 2A in embodiment) which drives a left wheel (e.g., a left rear wheel LWr in embodiment) of a vehicle; and a first speed changer (e.g., a first planetary type speed reducer 12A in embodiment) which is provided on a power transmission path between the first motor and the left wheel;

a right wheel driving system having: a second motor (e.g., a second motor 2B in embodiment) which drives a right wheel (e.g., a right rear wheel RWr in embodiment) of the vehicle; and a second speed changer (e.g., a second planetary gear type speed reducer 12B) which is provided on a power transmission path between the second motor and the right wheel; and a motor controller (e.g., a controller 8 in embodiment) which controls the first motor and the second motor, wherein:

the first and the second speed changers each has a first to third rotational elements;

the first motor is connected to the first rotational element (e.g., a sun gear 21A in embodiment) of the first speed changer;

the second motor is connected to the first rotational element (e.g., a sun gear 21B in embodiment) of the second speed changer;

the left wheel is connected to the second rotational element (e.g., a planetary carrier 23A in embodiment) of the first speed changer;

the right wheel is connected to the second rotational element (e.g., a planetary carrier 23B in embodiment) of the second speed changer;

the third rotational element (e.g., a ring gear 24A in embodiment) of the first speed changer and the third rotational element (e.g., a ring gear 24B in embodiment) of the second speed changer are connected to each other; the control method including:

a process of obtaining a target rotation state quantity (e.g., a first motor target rotation number MA2 in embodiment) and an actual rotation state quantity (e.g., a first motor actual rotation number MA1 in embodiment) of one of the first motor and the second motor;

a process of determining a rotation state quantity difference (e.g., a first rotation number difference DA in embodiment) which is a rotation state quantity difference between the target rotation state quantity and the actual rotation state quantity;

a process of determining a rotation state quantity control torque (e.g., a first rotation control torque SM1 in embodiment) based on the rotation state quantity difference; and a process of determining a control torque (e.g., a first motor torque M1 in embodiment) of the first motor and a control torque (e.g., a second motor torque M2 in embodiment) of the second motor based on the rotation state quantity control torque.

Further, the fifteenth aspect is characterized in that, in addition to the configuration according to any one of the twelfth to fourteenth aspects, the target rotation state quantity of the first motor or the second motor is determined based on at least one of an efficiency of the motor and an efficiency of an electric power supply unit which supplies electric power to the motor.

Further, the sixteenth aspect is characterized in that, in addition to the configuration according to any one of the twelfth to fourteenth aspects, the target rotation state quantity of the first motor or the second motor is determined based on a target rotation state quantity (e.g., a ring gear target rotation number in embodiment) of the third rotational elements.

Further, the seventeenth aspect is characterized in that, in addition to the configuration according to sixteenth aspect, the vehicle driving system includes at least one of a bidirectional rotation restricting unit (e.g., hydraulic brakes 60A, 60B in embodiment) which can be released or applied and which restricts a rotation of the third rotational elements in both directions by being applied and a unidirectional rotation restricting unit (e.g., a one-way clutch 50 in embodiment) which permits a rotation of the third rotational elements in one direction when it is disengaged, and which restricts a rotation of the third rotational element in the other direction when it is engaged, wherein when the third rotational elements are rotating, the target rotation state quantity of the third rotational elements are set so that the third rotational elements become a substantially zero rotating state.

Further, the eigteenth aspect is characterized in that, in addition to the configuration according to any one of the twelfth to fourteenth aspects:

the first and the second speed changers each has a fourth rotational element (e.g., planetary gears 22A, 22B in embodiment) which is supported by the second rotational element so as to be capable of revolving and which meshes with the first rotational element and the third rotational elements; and the target rotation state quantity of the first motor or the second motor is determined based on a target rotation state quantity (e.g., a target rotation number of the planetary gear in embodiment) of the fourth rotational element.

Further, the nineteenth aspect is characterized in that, in addition to the configuration according to the eighteenth aspect, the target rotation state quantity of the fourth rotational element is set so that a rotational direction of the fourth rotational element which is rotating in one direction or the other direction is not reversed.

Further, the twentieth aspect is characterized in that, in addition to the configuration according to any one of the fifteenth to nineteenth aspects, the target rotation state quantity of the first motor or the second motor is determined further based on an actual rotation state quantity of the second rotational element, or an actual rotation state quantity of the left wheel or the right wheel.

Further, the twenty-first aspect is characterized in that, in addition to the configuration according to any one of the twelfth to twentieth aspects:

target torque state quantities (e.g., a target motor base torque TTM1, a target motor base torque TTM2 in embodiment) of the first motor or the second motor are determined based on a target turning state quantity (e.g., a target yaw moment YMT in embodiment) of the vehicle;

a torque state quantity control torque (e.g., a first motor base torque TM1 in embodiment) of the first motor is determined based on the target torque state quantity of the first motor;

a torque state quantity control torque (e.g., a second motor base torque TM2 in embodiment) of the second motor is determined based on the target torque state quantity of the second motor; and the control torque of the first motor and the control torque of the second motor are determined further based on the torque state quantity control torque of the first motor and the torque state quantity control torque of the second motor.

Further, the twenty-second aspect is characterized in that, in addition to the configuration according to the twenty-first aspect:

a target torque state quantity difference (e.g., a target torque difference $\Delta TT$ in embodiment) between the first motor and the second motor is determined based on the target turning state quantity of the vehicle;

one of the target torque state quantity of the first motor and the target torque state quantity of the second motor is determined as a torque state quantity which is half the target torque state quantity difference in magnitude and which has a positive sign; and the other one of the target torque state quantity of the first motor and the target torque state quantity of the second motor is determined as a torque state quantity which is half the target torque state quantity difference in magnitude and which has a negative sign.

Advantage of the Invention

According to the first and twelfth aspects, the third rotational elements are connected to each other in the first speed changer and the second speed changer, and therefore, the first motor which is connected to the first speed changer and the second motor which is connected to the second speed changer cannot be controlled independently in complete manner. Therefore, although respective variation in rotation number is affected to each other, the first motor or the second motor can have a desired rotation state quantity without transmitting an unnecessary torque to the left and right wheels by applying torques which are equal in absolute value and which act in the same direction to the first motor and the second motor as a rotation state quantity control torque.

In addition, when there is a difference in rotation state quantity difference between the first motor and the second motor, one motor is allowed to hold the desired rotation state quantity and the other motor can be restrained from being controlled excessively by applying the rotation state quantity control torque which is determined based on the smaller rotation state quantity difference to the first and second motors as a rotation state quantity control torque.

According to the second and thirteenth aspects, the third rotational elements are connected to each other in the first speed changer and the second speed changer, and therefore, the first motor which is connected to the first speed changer and the second motor which is connected to the second speed changer cannot be controlled independently in complete manner. Therefore, although respective variation in rotation number is affected to each other, the first motor or the second motor can have a desired rotation state quantity without transmitting an unnecessary torque to the left and right wheels by applying torques which are equal in absolute value and which act in the same direction to the first motor and the second motor as a rotation state quantity control torque.

In addition, when there is a difference in rotation state quantity control torque between the first motor and the second motor, one motor is allowed to hold the desired rotation state quantity and the other motor can be restrained from being controlled excessively by applying the rotation state quantity control torque which is determined based on the smaller rotation state quantity control torque to the first and second motors.

According to the third and fourteenth aspects, the third rotational elements are connected to each other in the first speed changer and the second speed changer, and therefore, the first motor which is connected to the first speed changer and the second motor which is connected to the second speed changer cannot be controlled independently in complete manner. Therefore, although respective variation in rotation number is affected to each other, the first motor or the second motor can have a desired rotation state quantity without transmitting an unnecessary torque to the left and right wheels by applying torques which are equal in absolute value and which act in the same direction to the first motor and the second motor as a rotation control torque.

According to the fourth and fifteenth aspects, the electric power consumption can be reduced by determining the target rotation state quantity based on an efficiency of the motor and/or an efficiency of the electric power supply unit. In other words, the rotation numbers of the motors can be set so that the electric power consumption is the least by making use of the advantage that the rotation numbers of the motors can be set to an arbitrary rotation number.

According to the fifth and sixteenth aspects, the third rotational elements can have the desired rotation state quantity, whereby the third rotational elements are allowed to be in a state in which the rotation loss is small, for example.

According to the sixth and seventeenth aspects, by allowing the bidirectional rotation restricting unit to be applied or the unidirectional rotation restricting unit to be brought into engagement when the rotation number of the third rotational elements decreases to such an extent that the third rotational elements become the substantially zero rotation state, whereby a shock that is produced when the bidirectional rotation restricting unit is applied or the unidirectional rotation restricting unit is brought into engagement can be reduced, or the deterioration of the bidirectional rotation restricting unit or the unidirectional rotation restricting unit can be reduced.

According to the seventh and eighteenth aspects, the rotating state of the fourth rotational element which meshes with the first and third rotational elements can be controlled appropriately.

According to the eights and nineteenth aspects, the production of a backlash due to a reverse in rotating direction of the fourth rotational element can be prevented, whereby the disturbance in torque that would otherwise be generated in the wheel by the backlash can be prevented.

According to the ninth and twentieth aspects, the target rotation state quantity of the motor is determined based on the actual rotation state quantity of the second rotational element or the actual rotation state quantity of the wheel in addition to the target rotation state quantity of the third rotational elements or the target rotation state quantity of the fourth rotational element, and therefore, the rotation of the third rotational elements or the rotation of the fourth rotational element can be controlled with better accuracy.

According to the tenth and twenty-first aspects, the desired turning state quantity of the vehicle can be attained while allowing the motors to hold the desired rotation state quantity by superposing the torque state quantity control torque which controls the turning state of the vehicle in addition to the rotation state quantity control torque.

According to the eleventh and twenty-second aspects, the torque state quantities to attain the target turning state quantity constitute the positive and negative opposite vectors on the first motor and the second motor which cancel each other to thereby maintain the torque state quantity difference constant. This enables the vehicle to have the desired turning state quantity in a stable fashion without affecting the synchronization of the rotation numbers of the motors based on the rotation state quantity control torque.

BRIEF DESCRIPTION OF THE DRAWINGS

FIG. 4 is a table describing a relationship between a front wheel driving system and the rear wheel driving system in vehicle states together with operating states of motors.

FIG. 14A is a velocity collinear diagram before the target rotation number control, FIG. 14B is a velocity collinear diagram during the target rotation number control, and FIG. 14C is a velocity collinear diagram after the target rotation number control.

FIG. 15A is a velocity collinear diagram before the target rotation number control, FIG. 15B is a velocity collinear diagram during the target rotation number control, and FIG. 15C is a velocity collinear diagram after the target rotation number control.

FIG. 16A is a velocity collinear diagram before the target rotation number control, FIG. 16B is a velocity collinear diagram during the target rotation number control, and FIG. 16C is a velocity collinear diagram after the target rotation number control.

MODE FOR CARRYING OUT THE INVENTION

Firstly, referring to FIGS. 1 to 3, an embodiment of a vehicle driving system according to the invention will be described.

Figure 1:
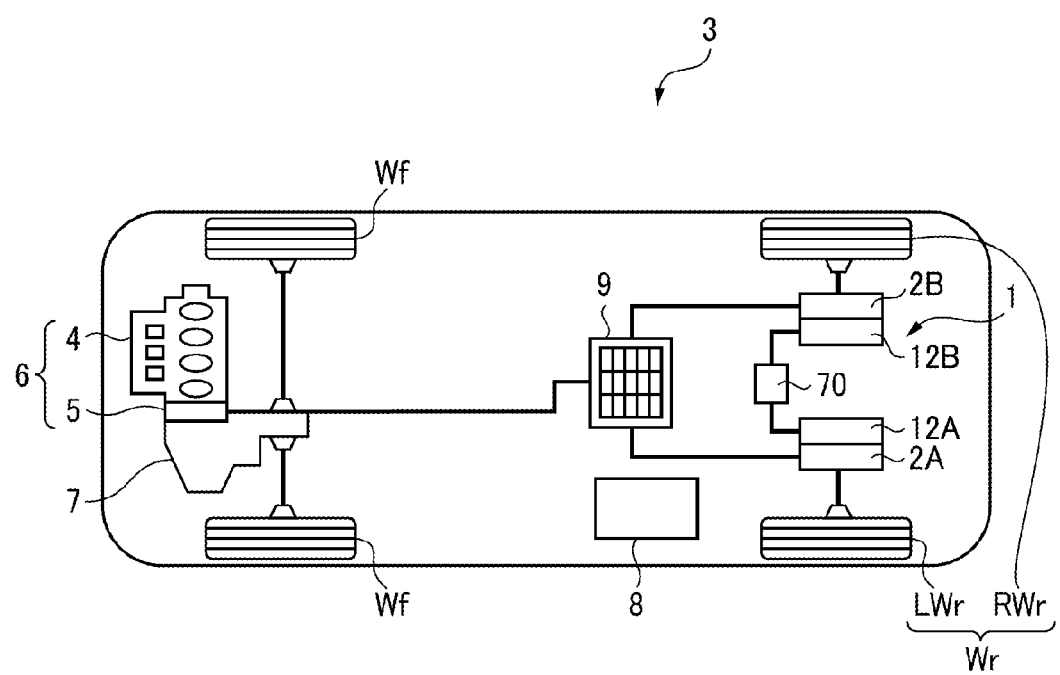
FIG. 1 is a block diagram showing a schematic configuration of a hybrid vehicle which is an embodiment of a vehicle which can install a vehicle driving system according to the invention.

The vehicle driving system according to the invention uses motors as drive sources for driving axles and is used, for example, in a driving system as shown in FIG. 1. In the following explanation, the vehicle driving system will be described as being applied to a rear wheel driving system, however, the vehicle driving system may be applied to a front wheel driving system.

A vehicle 3 shown in FIG. 1 is a hybrid vehicle having a driving system 6 (hereinafter, referred to as a front wheel driving system) in which an internal combustion engine 4 and a motor 5 are connected in series at a front portion of the vehicle. Power of this front wheel driving system 6 is transmitted to front wheels Wf via a speed changer 7, while power of a driving system 1 (hereinafter, referred to as a rear wheel driving system) which is provided at a rear portion of the vehicle separately from the front wheel driving system 6 is transmitted to rear wheels Wr (RWr, LWr). The motor 5 of the front wheel driving system 6 and first and second motors 2A, 2B of the rear wheel driving system 1 for the rear wheels Wr are connected to a battery 9 so that electric power is supplied thereto from the battery 9 and energy is recovered therein to be stored in the battery 9. Reference numeral 8 denotes a controller which executes various controls of the whole of the vehicle.

Figure 2:
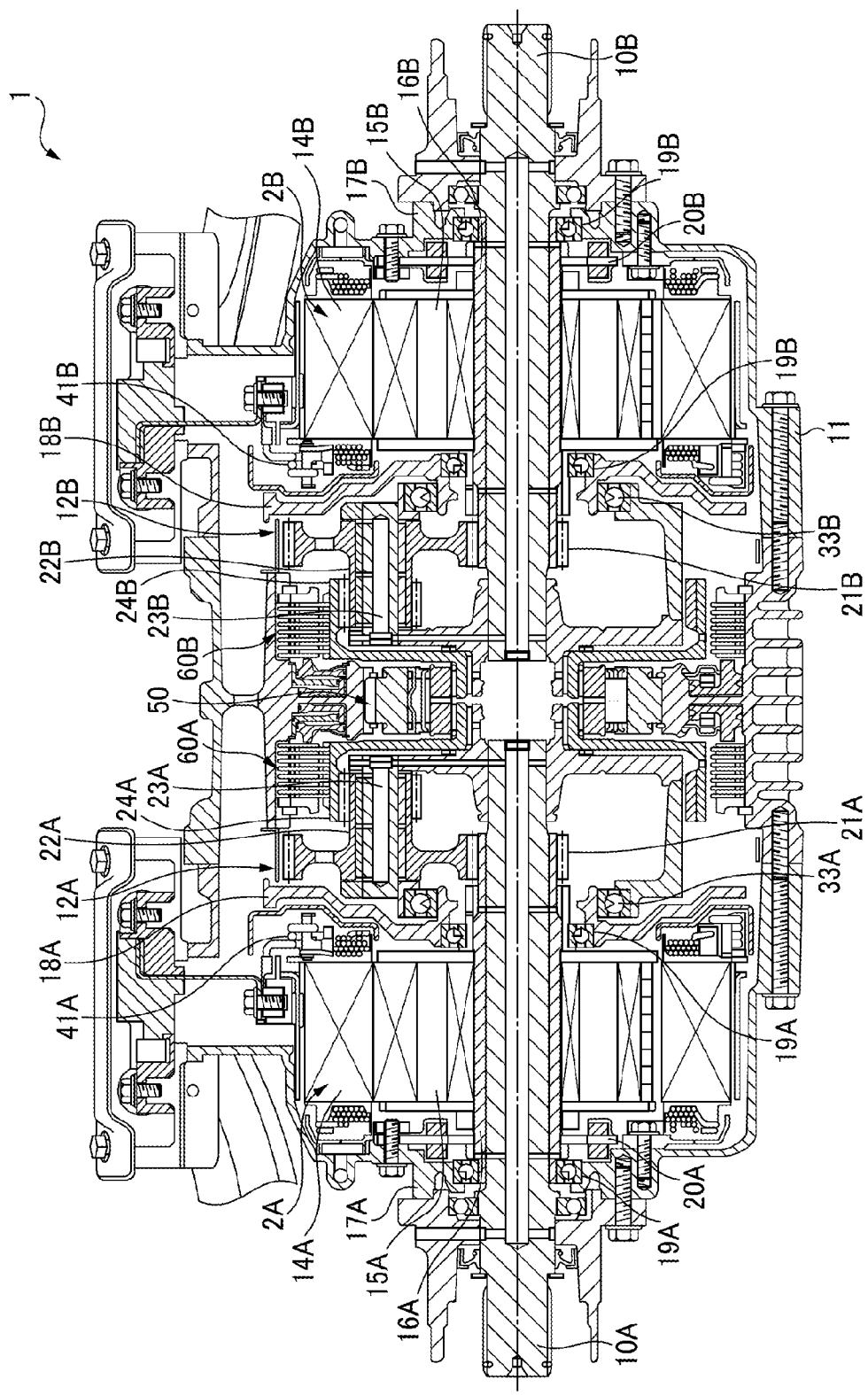
FIG. 2 is a vertical sectional view of an embodiment of a rear wheel driving system.
Figure 3:
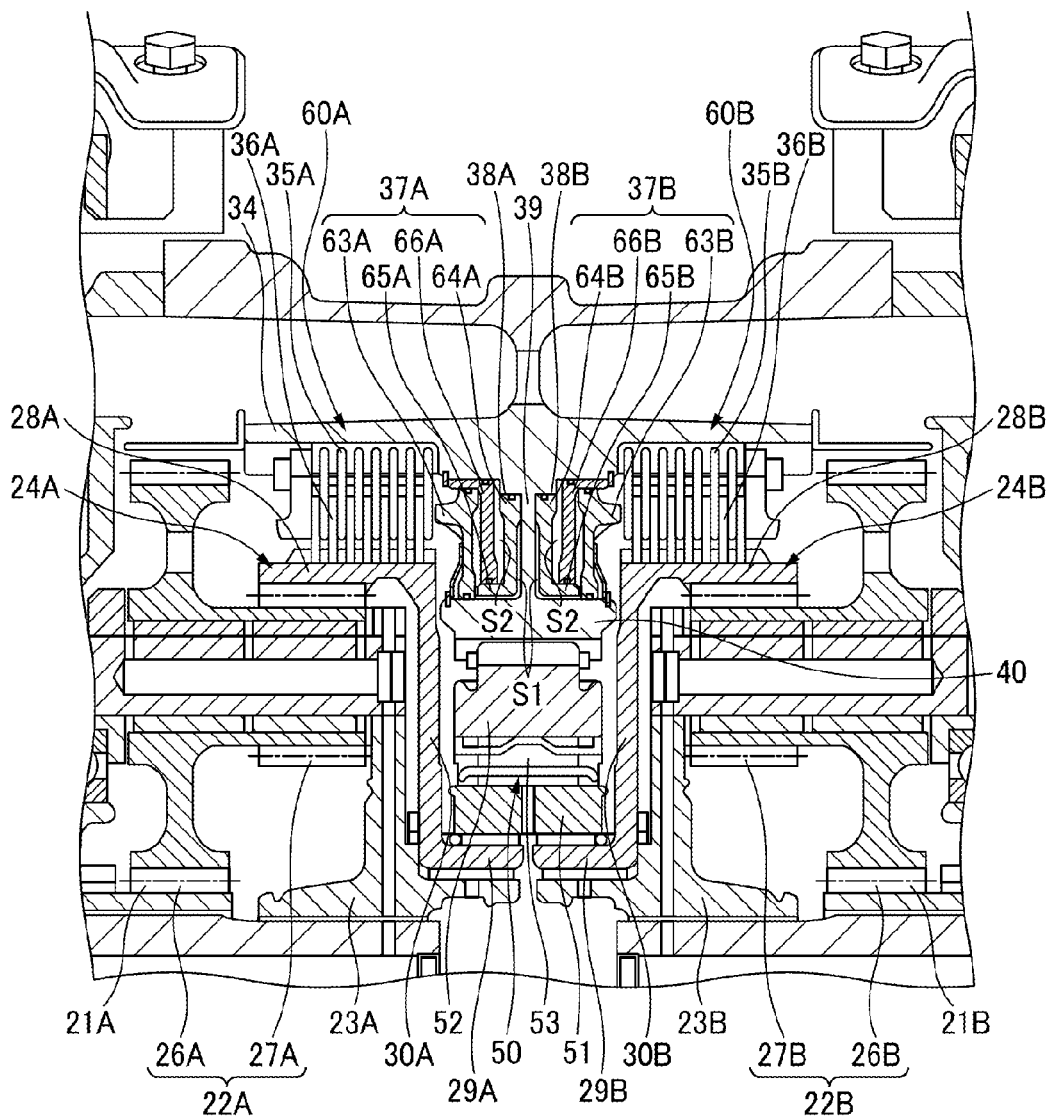
FIG. 3 is a partial enlarged view of the rear wheel driving system shown in FIG. 2.

FIG. 2 is a vertical sectional view of the whole of the rear wheel driving system 1. In the same figure, 10A, 10B denote left and right axles of the rear wheels Wr of the vehicle 3, which are disposed coaxially in a transverse direction of the vehicle. A speed reducer case 11 of the rear wheel driving system 1 is formed into a substantially cylindrical shape as a whole, and the first and second motors 2A, 2B for axle driving and a first and second planetary gear type speed reducers 12A, 12B which decelerate the driving rotations of the first and second motors 2A, 2B are disposed coaxially with the axles 10A, 10B in an interior of the speed reducer case 11. The first motor 2A and the first planetary type speed reducer 12A function as a left wheel driving system which drives the left rear wheel LWr, and the second motor 2B and the second planetary gear type speed reducer 12B function as a right wheel driving system which drives the right rear wheel RWr. The first motor 2A and the first planetary gear type speed reducer 12A and the second motor 2B and the second planetary type speed reducer 12B are disposed laterally symmetrical in the transverse direction of the vehicle within the speed reducer case 11.

Stators 14A, 14B of the first and second motors 2A, 2B are fixed to left and right end portions of the interior of the speed reducer case 11, and annular rotors 15A, 15B are disposed rotatably on inner circumferential sides of the stators 14A, 14B. Cylindrical shafts 16A, 16B which surround outer circumferences of the axles 10A, 10B are connected to inner circumferential portions of the rotors 15A, 15B. These cylindrical shafts 16A, 16B are supported in end walls 17A, 17B of the speed reducer case 11 and middle walls 18A, 18B via bearings 19A, 19B so as to rotate relatively to and concentrically with the axles 10A, 10B. Resolvers 20A, 20B are provided on outer circumferences of end portions of the cylindrical shafts 16A, 16B on the end walls 17A, 17B of the speed reducer case 11, the resolvers 20A, 20B being configured to feed back information on the rotational positions of the rotors 15A, 15B to controllers (not shown) for controlling the first and second motors 2A, 2B.

The first and second planetary gear type speed reducers 12A, 12B include sun gears 21A, 21B, plural planetary gears 22A, 22B which mesh with the sun gears 21A, 21B, planetary carriers 23A, 23B which support the planetary gears 22A, 22B and ring gears 24A, 24B which mesh with outer circumferential sides of the planetary gears 22A, 22B. Driving forces of the first and second motors 2A, 2B are inputted from the sun gears 21A, 21B, and the driving forces are decelerated to be outputted through the planetary carriers 23A, 23B.

The sun gears 21A, 21B are formed integrally with the cylindrical shafts 16A, 16B. As shown in FIG. 3, for example, the planetary gears 22A, 22B are double pinions having first pinions 26A, 26B having a large diameter which mesh directly with the sun gears 21A, 21B and second pinions 27A, 27B which are smaller in diameter than the first pinions 26A, 26B. The first pinions 26A, 26B and the second pinions 27A, 27B are formed integrally in such a state that the first pinions 26A, 26B and the second pinions 27A, 27B are concentric and are offset axially. The planetary gears 22A, 22B are supported by the planetary carriers 23A, 23B. Axial inner end portions of the planetary carriers 23A, 23B extend radially inwards to be spline fitted on the axles 10A, 10B so as to be supported thereon in such a way as to rotate together with the axles 10A, 10B. The planetary carriers 23A, 23B are also supported on the middle walls 18A, 18B via bearings 33A, 33B.

The middle walls 18A, 18B isolate motor accommodation spaces where the first and second motors 2A, 2B are accommodated from speed reducer accommodation spaces where the first and second planetary gear type speed reducers 12A, 12B are accommodated and are bent from a radially outer side to a radially inner side so as to expand an axial space therebetween. The bearings 33A, 33B which support the planetary carriers 23A, 23B are disposed at the radially inner sides of the middle walls 18A, 18B and on sides of the middle walls 18A, 18B which face the first and second planetary gear type speed reducers 12A, 12B. Bus rings 41A, 41B for the stators 14A, 14B are disposed at the radially outer sides of the middle walls 18A, 18B and on sides of the middle walls 18A, 18B which face the first and second motors 2A, 2B (refer to FIG. 2).

The ring gears 24A, 24B include gear portions 28A, 28B which mesh with the second pinions 27A, 27B, which are smaller in diameter, on inner circumferential surfaces thereof, small-diameter portions 29A, 29B which are smaller in diameter than the gear portions 28A, 28B and which are disposed opposite to each other in a middle position of the speed reducer case 11, and connecting portions 30A, 30B which connect together axial inner end portions of the gear portions 28A, 28B and axial outer end portions of the small-diameter portions 29A, 29B in a radial direction. In the case of this embodiment, a largest radius of the ring gears 24A, 24B is set so as to be smaller than a largest distance of the first pinions 26A, 26B from centers of the axles 10A, 10B. The small-diameter portions 29A, 29B both spline fit in inner races 51 of a one-way clutch 50, so that the ring gears 24A, 24B rotate together with the inner races 51 of the one-way clutch 50.

Incidentally, a cylindrical space portion is defined between the speed reducer case 11 and the ring gears 24A, 24B, and hydraulic brakes 60A, 60B, which constitutes brake units for the ring gears 24A, 24B, are disposed within the space portion so as to overlap the first pinions 26A, 26B in the radial direction and the second pinions 27A, 27B in the axial direction. In the hydraulic brakes 60A, 60B, plural fixed plates 35A, 35B which are spline fitted in an inner circumferential surface of a cylindrical radially outer support portion 34 which extends in the axial direction on a radially inner side of the speed reducer case 11 and plural rotational plates 36A, 36B which are spline fitted on outer circumferential surfaces of the ring gears 24A, 24B are disposed alternately in the axial direction. Then, these plates 35A, 35B, 36A, 36B are operated to be applied and released by annular pistons 37A, 37B. The pistons 37A, 37B are accommodated so as to move forwards and backwards within annular cylinder chambers 38A, 38B which are defined between a laterally dividing wall 39 which extends radially inwards from the middle position of the speed reducer case 11 and the radially outer support portion 34 and a radially inner support portion 40 which are connected by the laterally dividing wall 39. The pistons 37A, 37B are caused to move forwards by introducing highly-pressurized oil into the cylinder chambers 38A, 38B and are caused to move backwards by discharging the highly-pressurized oil from the cylinder chambers 38A, 38B. The hydraulic brakes 60A, 60B are connected to an electric oil pump 70 (refer to FIG. 1).

More specifically, the pistons 37A, 37B have first piston walls 63A, 63B and second piston walls 64A, 64B which are aligned sequentially in the axial direction, and these piston walls 63A, 63B, 64A, 64B are connected together by cylindrical inner circumferential walls 65A, 65B. Consequently, annular spaces which are opened radially outwards are defined between the first piston walls 63A, 63B and the second piston walls 64A, 64B, and the annular spaces are divided laterally in the axial direction by partition members 66A, 66B which are fixed to inner circumferential surfaces of outer walls of the cylinder chambers 38A, 38B. Spaces defined between the laterally dividing wall 39 of the speed reducer case 11 and the second piston walls 64A, 64B are made into first working chambers S1 into which the highly-pressurized oil is introduced directly. Spaces defined between the partition members 66A, 66B and the first piston walls 63A, 63B are made into second working chambers S2 which communicate with the first working chambers S1 via through holes formed in the inner circumferential walls 65A, 65B. Spaces defined between the second piston walls 64A, 64B and the partition members 66A, 66B communicate with the atmosphere.

In the hydraulic brakes 60A, 60B, oil is introduced into the first working chambers S1 and the second working chambers S2 from a hydraulic circuit, not shown, whereby the fixed plates 35A, 35B and the rotational plates 36A, 36B are pressed against each other by virtue the pressure of the oil which acts on the first piston walls 63A, 63B and the second piston walls 64A, 64B. Consequently, a large pressure bearing surface area can be gained by the first and second piston walls 63A, 63B. 64A, 64B which are aligned sequentially in the axial direction, and therefore, it is possible to obtain a large pressing force for the fixed plates 35A, 35B and the rotational plates 36A, 36B while suppressing the radial surface areas of the pistons 37A, 37B.

In the case of the hydraulic brakes 60A, 60B, the fixed plates 35A, 35B are supported on the radially outer support portion 34 which extends from the speed reducer case 11, while the rotational plates 36A, 36B are supported on the ring gears 24A, 24B. Therefore, when both the plates 35A, 35B and the plates 36A, 36B are pressed against each other by the pistons 37A, 37B, both the plates 35A, 35B and the plates 36A, 36B are frictionally fastened together, and a braking force acts on the ring gears 24A, 24B, whereby the ring gears 24A, 24B are fixed (locked). Then, when the frictionally fastened state of the plates by the pistons 37A, 37B is released from that state, the ring gears 24A, 24B are permitted to rotate freely.

Additionally, a space portion is ensured between the connecting portions 30A, 30B of the ring gears 24A, 24B that face oppositely each other in the axial direction, and the one-way clutch 50 is disposed within the space portion, the one-way clutch 50 being configured to transmit power to the ring gears 24A, 24B only in one direction and cut off power that is attempted to be transmitted in the other direction. The one-way clutch 50 is such that a large number of sprags 53 are interposed between the inner races 51 and the outer race 52, and the inner races 51 spline fit on the small-diameter portions 29A, 29B of the ring gears 24A, 24B so as to rotate together therewith. The outer race 52 is positioned and restricted from rotation by the radially inner support portion 40. The one-way clutch 50 is engaged to lock the rotation of the ring gears 24A, 24B when the vehicle 3 travels forwards with the power of the first and second motors 2A, 2B. To describe this more specifically, the one-way clutch 50 is engaged when torques in a forward direction (a rotational direction when the vehicle 3 is caused to travel forwards) of the first and second motors 2A, 2B are inputted into the rear wheels Wr, while the one-way clutch 50 is disengaged when torques in a reverse direction of the first and second motors 2A, 2B are inputted into the rear wheels Wr. Additionally, the one-way clutch 50 is disengaged when torques in the forward direction of the rear wheels Wr are inputted into the first and second motors 2A, 2B, while the one-way clutch 50 is engaged when torques in the reverse direction of the rear wheels Wr are inputted into the first and second motors 2A, 2B. In other words, when it is disengaged, the one-way clutch 50 permits the rotation of the ring gears 24A, 24B in one direction by the torques in the reverse direction of the first and second motors 2A, 2B, while when it is engaged, the one-way clutch 50 restricts the rotation of the ring gears 24A, 24B in the reverse direction by the torques in the forward direction of the first and second motors 2A, 2B. The torques in the reverse direction denote a torque which acts in a direction to increase the rotation of the ring gears 24A, 24B in the reverse direction or a torque which acts in a direction to decrease the rotation of the ring gears 24A, 24B in the forward direction.

In this way, in the rear wheel driving system 1 of this embodiment, the one-way clutch 50 and the hydraulic brakes 60A, 60B are provided in parallel on the power transmission paths between the first and second motors 2A, 2B and the rear wheels Wr. It is noted that the two hydraulic brakes 60A, 60B do not have to be provided, and hence, a hydraulic brake is provided only in one of the spaces, and the other space may be used as a breather chamber.

Here, the controller 8 (refer to FIG. 1) is a controller which executes various controls in relation to the whole of the vehicle. Values read by wheel speed sensors, values read by motor rotation number sensors of the first and second motors 2A, 2B, a steering angle, an accelerator position AP, a shift position, a state of charge (SOC) of the battery 9, an oil temperature and the like are inputted into the controller 8. On the other hand, a signal which controls the internal combustion engine 4, signals which controls the first and second motors 2A, 2B, a control signal which controls the electric oil pump 70 and the like are outputted from the controller 8.

Namely, the controller 8 includes at least a function as a motor controller which controls the first and second motors 2A, 2B.

FIG. 4 is a table describing a relationship between a front wheel driving system 6 and the rear wheel driving system 1 in vehicle states together with operating states of the first and second motors 2A, 2B. In the figure, a front unit represents the front wheel driving system 6, a rear unit represents the rear wheel driving system 1, a rear motor represents the first and second motors 2A, 2B, OWC represents the one-way clutch 50, and BRK represents the hydraulic brakes 60A, 60B. Additionally, FIGS. 5 to 10 and FIGS. 12A to 17 show velocity collinear diagrams of several states of the rear wheel driving system 1, and in the figures, LMOT represents the first motor 2A, and RMOT represents the second motor 2B. S, C, PG on a left-hand side represent the sun gear 21A of the first planetary gear type speed reducer 12A which is connected to the first motor 2A, the planetary carrier 23A of the first planetary gear type speed reducer 12A, and the planetary gear 22B of the second planetary gear type speed reducer 12B, respectively. S, C, PG on a right-hand side represent the sun gear 21B of the second planetary gear type speed reducer 12B, the planetary carrier 23B of the second planetary gear type speed reducer 12B, and the planetary gear 22A of the first planetary gear type speed reducer 12A, respectively. R represents the ring gears 24A, 24B of the first and second planetary gear type speed reducers 12A, 12B, BRK represents the hydraulic brakes 60A, 60B, and OWC represents the one-way clutch 50. In the following explanation, a rotational direction of the sun gears 21A, 21B when the vehicle is driven forwards by the first and second motors 2A, 2B is referred to as the forward direction. Additionally, in the figures, a portion above a line denoting a state in which the vehicle is stopped denotes a forward rotation, whereas a portion below the line denotes a backward rotation. Arrows directed upwards denote forward torque, whereas arrows directed downwards denote backward torque.

Figure 5:
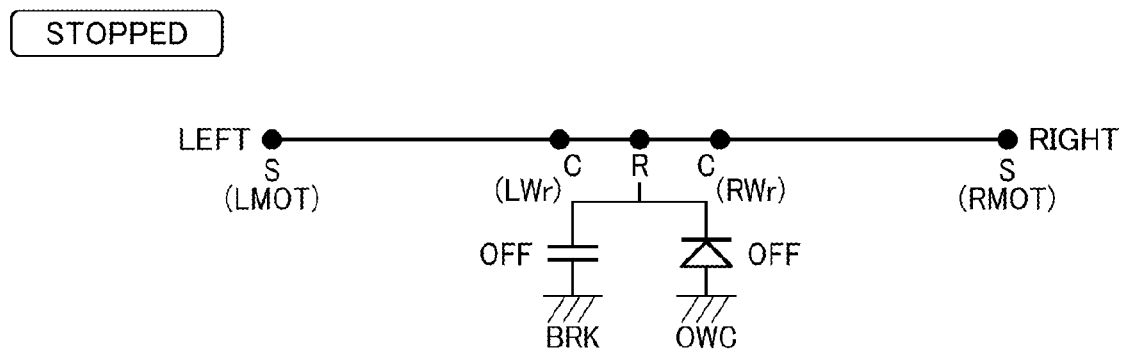
FIG. 5 is a velocity collinear diagram of the rear wheel driving system while the vehicle is stopped.

While the vehicle is stopped, neither the front wheel driving system 6 nor the rear wheel driving system 1 is driven. Consequently, as shown in FIG. 5, the first and second motors 2A, 2B of the rear wheel driving system 1 are stopped, and hence, the axles 10A, 10B are also stopped. Therefore, no torque acts on any one of the constituent elements. In this state, the hydraulic brakes 60A, 60B are released (OFF). Additionally, since the motors 2A, 2B are not driven, the one-way clutch 50 is not engaged (OFF).

Figure 6:
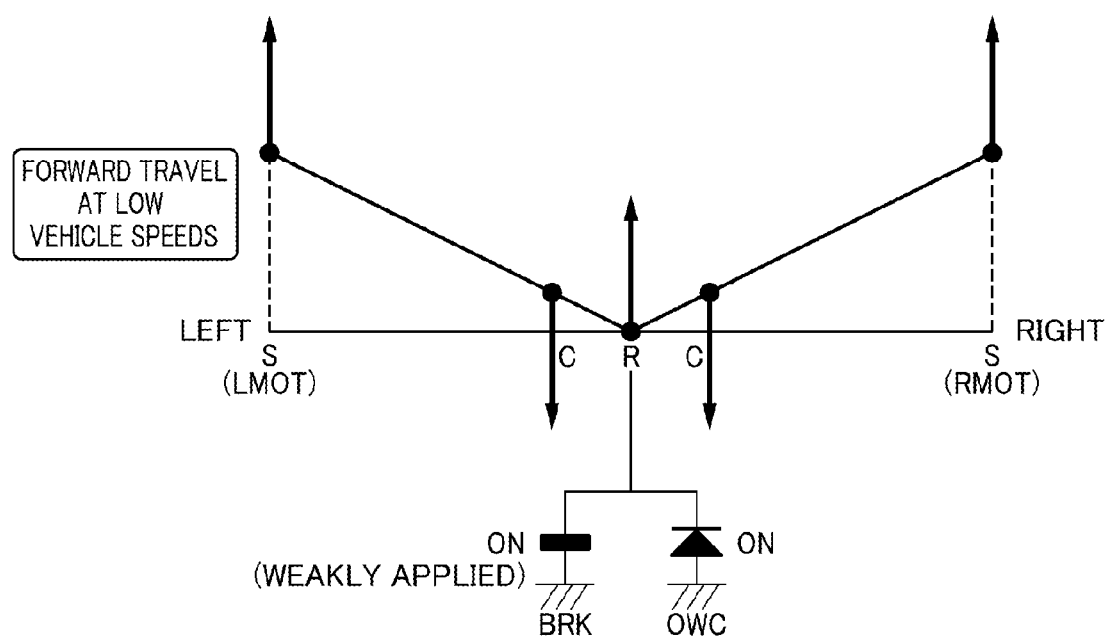
FIG. 6 is a velocity collinear diagram of the rear wheel driving system while the vehicle is traveling forwards at low vehicle speeds.

Then, while the vehicle is traveling forwards at low vehicle speeds by EV start and EV cruise with good motor efficiency after an ignition key is placed in an ON position, the vehicle is driven based on a rear-wheel drive by the rear wheel driving system 1. As shown in FIG. 6, when the first and second motors 2A, 2B are driven to rotate in the forward direction for power running, forward torques are applied to the sun gears 21A, 21B. At that time, as has been described before, the one-way clutch 50 is engaged, and the ring gears 24A, 24B are locked. This causes the planetary carriers 23A, 23B to rotate in the forward direction, whereby the vehicle 3 travels forwards. It is noted that running resistance acts on the planetary carriers 23A, 23B from the axles 10A, 10B in the reverse direction. In this way, when the vehicle is started, the ignition is switched on and the torque of the motors 2A, 2B is increased, whereby the one-way clutch 50 is engaged mechanically, and the ring gears 24A, 24B are locked.

At that time, the hydraulic brakes 60A, 60B are controlled to be a weakly applied state. Here, the weakly applied means a state in which the hydraulic brakes 60A, 60B are applied with an application force that is weaker than an application force of an applied state with which the hydraulic brakes 60A, 60B are applied properly, although the power transmission is enabled. The one-way clutch 50 is engaged when the forward torques of the first and second motors 2A, 2B are inputted into the rear wheels Wr, and the power can be transmitted only by the one-way clutch 50. However, by keeping the hydraulic brakes 60A, 60B in the weakly applied state and also keeping the motors 2A, 2B and the wheels Wr in the connected state, even when the input of the forward rotational power from the motors 2A, 2B is temporarily decreased, thereby putting the one-way clutch 50 in a disengaged state, it is possible to restrain the power transmission between the motors 2A, 2B and the wheels Wr from being interrupted. Additionally, a rotation number control is unnecessary which is performed to hold the connection between the first and second motors 2A, 2B and the rear wheels Wr when the vehicle 3 is shifted to a regenerative deceleration, which will be described later. Energy consumed to apply the hydraulic brakes 60A, 60B is reduced by making the application force of the hydraulic brakes 60A, 60B when the one-way clutch 50 is engaged weaker than the application force of the hydraulic brakes 60A, 60B when the one-way clutch 50 is disengaged.

Figure 7:
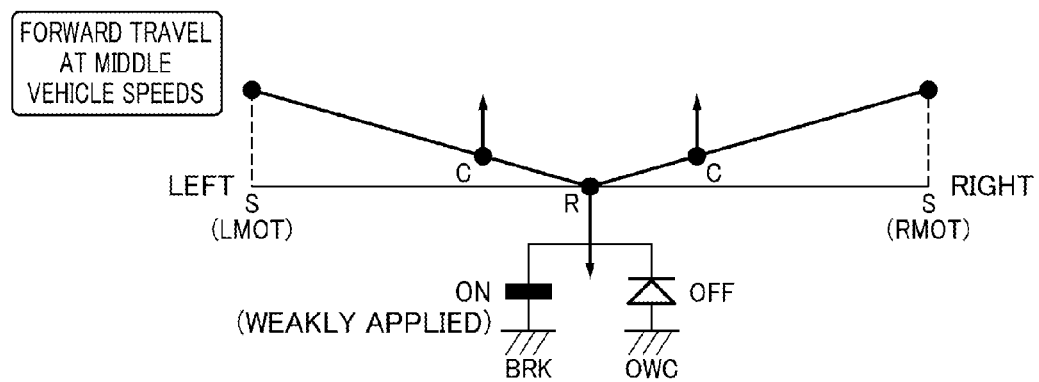
FIG. 7 is a velocity collinear diagram of the rear wheel driving system while the vehicle is traveling forwards at middle vehicle speeds.

When the vehicle 3 comes to be driven forwards at middle vehicle speeds with good engine efficiency as a result of the vehicle speed increasing from the forward driving at low vehicle speeds, the driving of the vehicle 3 is shifted from the rear-wheel drive by the rear wheel driving system 1 to a front-wheel drive by the front wheel driving system 6. As shown in FIG. 7, when the driving of the first and second motors 2A, 2B for power running is stopped, the forward torques which attempt to drive the vehicle 3 forwards are applied to the planetary carriers 23A, 23B from the axles 10A, 10B, whereby the one-way clutch 50 is disengaged as has been described before. At that time, too, the hydraulic brakes 60A, 60B are controlled to be the weakly applied state.

Figure 8:
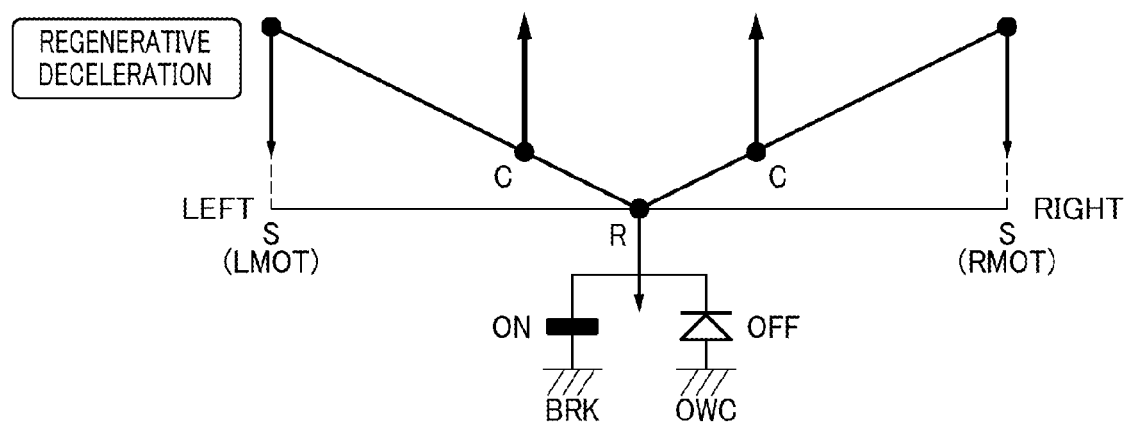
FIG. 8 is a velocity collinear diagram of the rear wheel driving system while the vehicle is being decelerated for regeneration.

When the first and second motors 2A, 2B are attempted to be driven for regeneration from the state shown in FIG. 6 or 7, as shown in FIG. 8, the forward torques which attempt to keep the vehicle 3 traveling forwards are applied to the planetary carriers 23A, 23B from the axles 10A, 10B, whereby the one-way clutch 50 is disengaged as has been described before. At that time, the hydraulic brakes 60A, 60B are controlled to be the applied state (ON). Consequently, the ring gears 24A, 24B are locked, and regenerative braking torques acting in the reverse direction are applied to the first and second motors 2A, 2B, whereby a regenerative deceleration is performed at the first and second motors 2A, 2B. In this way, the one-way clutch 50 is disengaged when the forward torques of the rear wheels Wr are inputted into the first and second motors 2A, 2B, and hence, the power cannot be transmitted only by the one-way clutch 50. However, the hydraulic brakes 60A, 60B, which are provided in parallel to the one-way clutch 50, are applied to hold the connection between the first and second motors 2A, 2B and the rear wheels Wr, whereby the power can be kept transmitted to the rear wheels Wr. By controlling the first and second motors 2A, 2B to be driven for regeneration in this state, the energy of the vehicle 3 can be regenerated.

Following this, when the vehicle is accelerated, the vehicle 3 is driven through four-wheel drive by the front wheel driving system 6 and the rear wheel driving system 1, and the rear wheel driving system 1 works in the same way as the forward driving at low vehicle speeds shown in FIG. 6.

When the vehicle 3 travels forwards at high vehicle speeds, the vehicle 3 is driven based on the front-wheel drive by the front wheel driving system 6, and at that time, the first and second motors 2A, 2B are stopped, and the hydraulic brakes 60A, 60B are controlled to be a released state. The one-way clutch 50 is disengaged since the forward torques of the rear wheels Wr are inputted into the first and second motors 2A, 2B. Thus, the ring gears 24A, 24B start rotating by controlling the hydraulic brakes 60A, 60B to be the released state.

Figure 9:
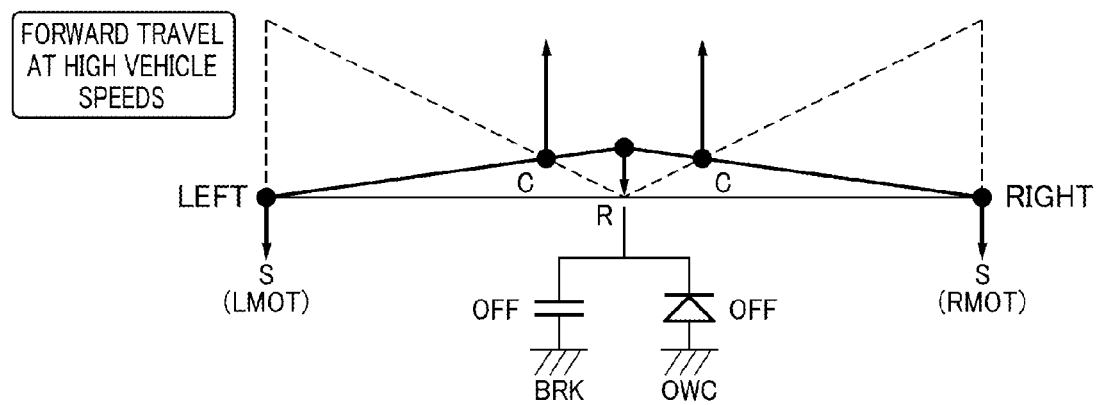
FIG. 9 is a velocity collinear diagram of the rear wheel driving system while the vehicle is traveling forwards at high vehicle speeds.

As shown in FIG. 9, when the driving of the first and second motors 2A, 2B for power running is stopped, the forward torques which attempt to cause the vehicle 3 to travel forwards are applied to the planetary carriers 23A, 23B from the axles 10A, 10B, whereby the one-way clutch 50 is disengaged as has been described before. At that time, rotation losses of the sun gears 21A, 21B and the first and second motors 2A, 2B are inputted into the sun gears 21A, 21B as resistance, and rotation losses of the ring gears 24A, 24B are generated in the ring gears 24A, 24B.

The ring gears 24A, 24B are permitted to rotate freely (hereinafter, referred to as a ring free state) by controlling the hydraulic brakes 60A, 60B to be the released state, and the connection between the first and second motors 2A, 2B and the rear wheels Wr is cut off, whereby no power can be transmitted to the rear wheels Wr. Consequently, the first and second motors 2A, 2B are prevented from being forced to rotate by the rear wheels Wr in an associated fashion. This prevents the excessive rotation of the first and second motors 2A, 2B when the vehicle is driven at high vehicle speeds by the front wheel driving system 6. In the above explanation, the first and second motors 2A, 2B are stopped when the ring gears 24A, 24B are in the ring free state. However, the first and second motors 2A, 2B may be driven in the ring free state (hereinafter, referred to simply as a ring free control). The ring free control will be described later.

Figure 10:
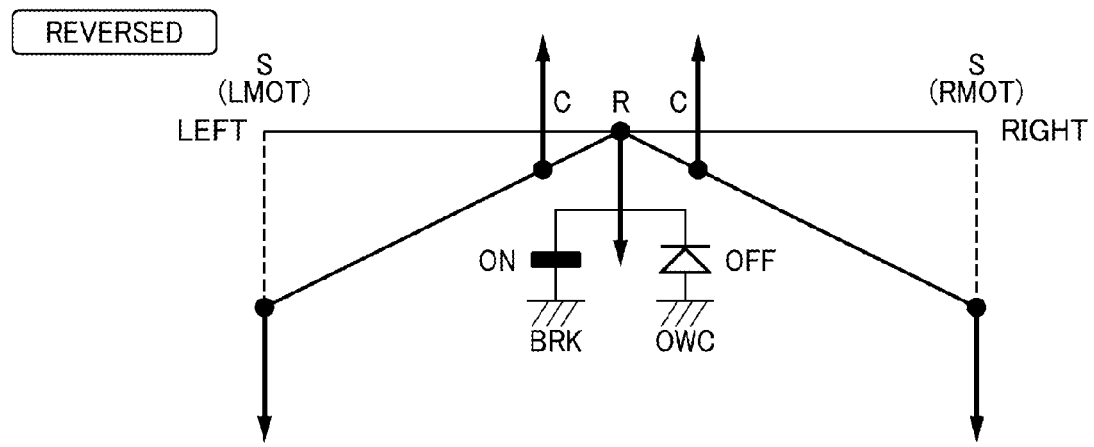
FIG. 10 is a velocity collinear diagram of the rear wheel driving system while the vehicle is being reversed.

When the vehicle 3 is reversed, as shown in FIG. 10, the first and second motors 2A, 2B are driven for power running in the reverse direction, whereby reverse torques are applied to the sun gears 21A, 21B. At that time, the one-way clutch 50 is disengaged as has been described before.

At that time, the hydraulic brakes 60A, 60B are controlled to be applied. Consequently, the ring gears 24A, 24B are locked, and the planetary carriers 23A, 23B rotate in the reverse direction, whereby the vehicle 3 is driven in the reverse direction. It is noted that the running resistance in the forward direction is applied to the planetary carriers 23A, 23B from the axles 10A, 10B. In this way, the one-way clutch 50 is disengaged when the reverse torques of the first and second motors 2A, 2B are inputted into the rear wheels Wr. Thus, the power cannot be transmitted only by the one-way clutch 50. However, the hydraulic brakes 60A, 60B, which are provided in parallel to the one-way clutch 50, are applied to hold the connection between the first and second motors 2A, 2B and the rear wheels Wr, whereby the power can still be transmitted to the rear wheels Wr, thereby making it possible to reverse the vehicle 3 by the torques of the first and second motors 2A, 2B.

In this way, in the rear wheel driving system 1, the hydraulic brakes 60A, 60B are controlled to be applied or released according to the running state of the vehicle, in other words, depending upon whether the first and second motors 2A, 2B rotate in the forward direction or in the reverse direction and whether the power is inputted from the first and second motors 2A, 2B or from the rear wheels Wr. Further, the application forth of the hydraulic brakes 60A, 60B is controlled even when the hydraulic brakes 60A, 60B are applied.

Figure 11:
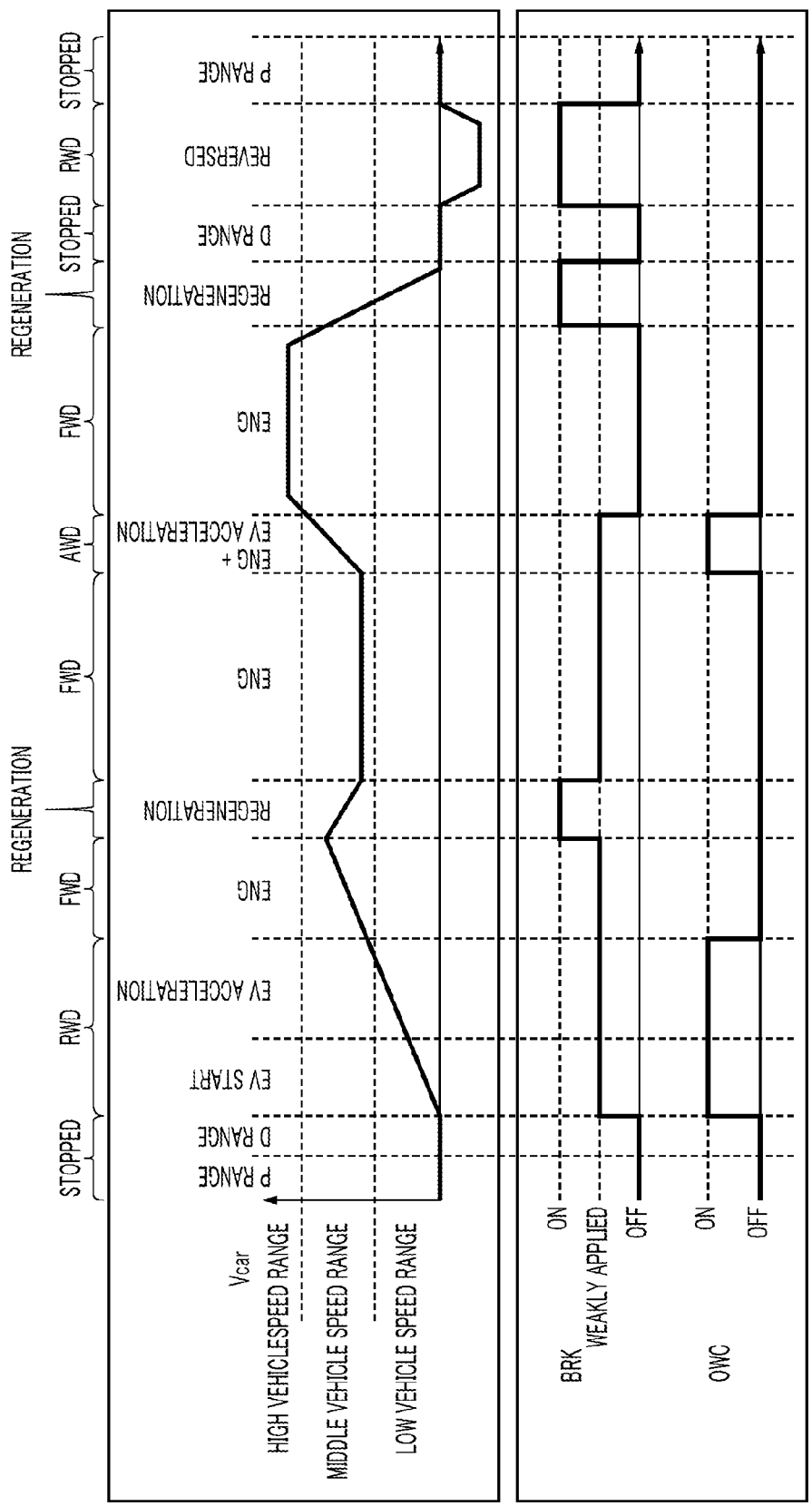
FIG. 11 is a timing chart while the vehicle is running.

FIG. 11 is a timing chart of the electric oil pump 70 (EOP), the one-way clutch 50 (OWC), and the hydraulic brakes 60A, 60B (BRK) when the vehicle goes through a series of actions from a stopped state to the stopped state through EV start→EV acceleration→ENG acceleration→regenerative deceleration→ENG cruise at middle vehicle speeds→ENG+EV acceleration→ENG cruise at high vehicle speeds→regenerative deceleration→stop→reversing.

Firstly, the one-way clutch 50 is kept in the disengaged state (OFF), and the hydraulic brakes 60A, 60B are kept in the released state (OFF) until the ignition key is placed in the ON position, a gear shift lever is shifted from P range to D range and an accelerator pedal is depressed. Then, when the accelerator pedal is depressed, the vehicle is EV started and EV accelerated based on rear-wheel drive (RWD) by the rear wheel driving system 1. At that time, the one-way clutch 50 is engaged (ON), and the hydraulic brakes 60A, 60B are controlled to the weakly applied state. Then, when the vehicle speed increases from a low vehicle speed range to reach a middle vehicle speed range, where the driving mode is shifted from rear-wheel drive to front-wheel drive, the vehicle is ENG driven (FWD) by the internal combustion engine 4. At that time, the one-way clutch 50 is disengaged (OFF), while the hydraulic brakes 60A, 60B are kept in the state (the weakly applied state). Then, when a regenerative deceleration is performed, for example when a brake pedal is depressed to decelerate the vehicle, the hydraulic brakes 60A, 60B are controlled to the applied state (ON), with the one-way clutch 50 kept disengaged (OFF). The vehicle is kept in the same state as the ENG driving described above when the vehicle is driven to cruise at middle vehicle speeds by the internal combustion engine 4. Following this, when the accelerator pedal is depressed further, switching the driving mode from the front-wheel drive to the four-wheel drive (AWD), the one-way clutch 50 is engaged (ON) again. Then, when the vehicle speed increases from the middle vehicle speed range to a high vehicle speed range, the vehicle is ENG driven (FWD) again by the internal combustion engine 4. At that time, the one-way clutch 50 comes to the disengaged state (OFF), and the hydraulic brakes 60A, 60B are controlled to the released state (OFF). Then, when no request is made to drive the first and second motors 2A, 2B, the first and second motors 2A, 2B are stopped, while the request is made, the ring free control, which will be described later, is performed. Then, when a regenerative deceleration is performed, the regenerative deceleration described above occurs. When the vehicle comes to the stopped state, the one-way clutch 50 comes to the disengaged state (OFF), and the hydraulic brakes 60A, 60B are controlled to the released state (OFF).

Following this, when the vehicle is reversed, the hydraulic brakes 60A, 60B are controlled to the applied state (ON), with the one-way clutch 50 kept disengaged (OFF). Then, when the vehicle comes to the stopped state, the one-way clutch 50 is disengaged (OFF), and the hydraulic brakes 60A, 60B are controlled to the released state (OFF).

Next, the ring free control, which characterizes the invention, will be described.

The ring free control is a driving control of the first and second motors 2A, 2B in such a state that the one-way clutch 50 is disengaged and the hydraulic brakes 60A, 60B are released, in other words, in such a state that the ring gears 24A, 24B which are connected together are permitted to rotate freely (the ring free state). In this control, in order to generate a target yaw moment (a target lateral torque difference) a target torque can be generated in the first and second motors 2A, 2B (a target torque control), or the first and/or second motors 2A, 2B can be controlled to achieve a target rotation number (a target rotation number control). In the following explanation, although a rotation number (r/min) is used as a rotation state quantity, the rotation state quantity is not limited to the rotation number (r/min), and hence, other state quantities including an angular velocity (rad/s) or the like may be used. Similarly, although a motor torque (N·m) is used as a torque state quantity, other torque state quantities including a motor current (A) which correlates with motor torque may be used.

<Target Torque Control>

In the ring free state, as has been described above, the connection between the first and second motors 2A, 2B and the rear wheels Wr is cut off, resulting in the state where no power is transmitted therebetween. However, by controlling the first motor 2A to generate therein a forward or reverse torque and the second motor 2B to generate therein a torque (a reverse or forward torque) having the same absolute value as that of the torque generated in the first motor 2A and acting in an opposite direction to the direction in which the torque of the first motor 2A acts, a lateral torque difference can be generated between the left rear wheel LWr and the right rear wheel RWr without generating a variation in rotation number in the first and second motors 2A, 2B so as to generate a desired yaw moment.

Figure 12A:
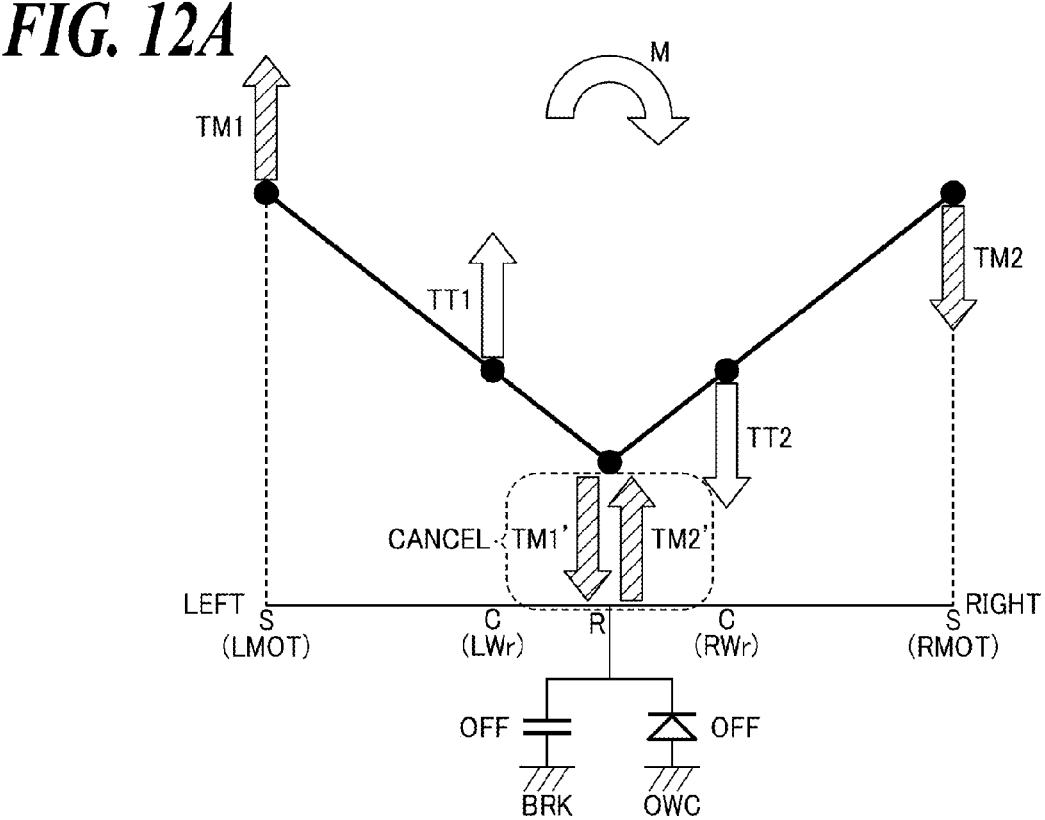
FIG. 12A is a velocity collinear diagram of the rear wheel driving system when the motors are controlled to attain their target torques while the vehicle is traveling forwards at high vehicle speeds.

Referring to FIG. 12A, this will be described specifically by taking, for example, a case where a clockwise yaw moment M is generated in the vehicle 3 as an example. By executing a torque control on the first motor 2A so that a forward first motor base torque TM1 is generated therein, the forward first motor base torque TM1 acts on the sun gear 21A. At that time, as with the state shown in FIG. 9, a forward torque (not shown) which attempts to move the vehicle forwards is being applied to the planetary carrier 23A from the axle 10A. Consequently, in the first planetary gear type speed reducer 12A, as a result of the forward first motor base torque TM1 acting on the sun gear 21A which functions as a force point, with the planetary carrier 23A functioning as a support point, a reverse first motor base torque distribution force TM1' acts on the ring gears 24A, 24B which function as a action point. It is noted that vectors based on losses occurring steadily in the individual rotational elements are also omitted from FIGS. 12A and 12B on.

On the other hand, by executing a torque control on the second motor 2B so that a reverse second motor base torque TM2 is generated therein, the reverse second motor base torque TM2 acts on the sun gear 21B. At that time, as with the state shown in FIG. 9, a forward torque (not shown) which attempts to move the vehicle forwards is being applied to the planetary carrier 23B from the axle 10B. Consequently, in the second planetary gear type speed reducer 12B, as a result of the reverse second motor base torque TM2 acting on the sun gear 21B which functions as a force point, with the planetary carrier 23B functioning as a support point, a forward second motor base torque distribution force TM2' acts on the ring gears 24A, 24B which function as a action point.

Here, since the first motor base torque TM1 and the second motor base torque TM2 are the torques having the equal absolute values and acting in the opposite directions, the reverse first motor base torque distribution force TM1' and the forward second motor base torque distribution force TM2' which act on the ring gears 24A, 24B cancel out each other (cancel). Consequently, the first motor base torque TM1 and the second motor base torque TM2 do not contribute to a variation in rotation, and therefore, the sun gears 21A, 21B and the ring gears 24A, 24B are maintained in their rotating states. At that time, a forward left rear wheel torque TT1 which results from multiplying the first motor base torque TM1 by a reduction gear ratio of the first planetary gear type speed reducer 12A acts on the planetary carrier 23A, and a reverse right rear wheel torque TT2 which results from multiplying the second motor base torque TM2 by a reduction gear ratio of the second planetary gear type speed reducer 12B acts on the planetary carrier 23B.

The reduction gear ratios of the first and second planetary gear type speed reducers 12A, 12B are equal, and therefore, the left and right rear wheel torques TT1, TT2 become torques having the same absolute value and acting in the opposite directions. This generates stably a clockwise yaw moment M which corresponds to a difference (TT1−TT2) between the left and right rear wheel torques TT1, TT2.

A target motor base torque used when a target torque control is performed on the first and second motors 2A, 2B is determined based on a target yaw moment of the vehicle 3. How to determine this target motor base torque will be described by the use of the following equations.

When letting a left rear wheel target torque of the left rear wheel LWr be WTT1, a right rear wheel target torque of the right rear wheel RWr be WTT2, a total target torque (a sum of left rear wheel torque and right rear wheel torque) of the left and right rear wheels LWr, RWr be TRT, and a target torque difference between the left and right rear wheels LWr, RWr (a difference between left rear wheel torque and right rear wheel torque) be ΔTT, the following equations (1), (2) are established.

$$WTT1+WTT2=TRT \quad (1)$$

$$WTT1-WTT2=\Delta TT \quad (2)$$

When letting a target yaw moment (a clockwise yaw moment is referred to as a positive one) be YMT, a radius of the wheel be r, and a tread (a transverse distance between the left and right rear wheels LWr, RWr) be Tr, ΔTT is expressed by the following equation (3).

$$\Delta TT=2\cdot r\cdot YMT/Tr \quad (3)$$

Here, in the ring free state, the torques of the first and second motors 2A, 2B which act in the same direction are not transmitted to the rear wheels Wr, and therefore, the total target torque TRT of the left and right rear wheels LWr, RWr is zero. Consequently, the target torques WTT1, WTT2 of the left and right rear wheels LWr, RWr are determined unambiguously from the equations (1), (2) above.

Namely, $$WWT1=-WTT2=\Delta TT/2 \quad (4)$$

In addition, when letting a target motor base torque of the first motor 2A which is connected to the left rear wheel LWr be TTM1 and a target motor base torque of the second motor 2B which is connected to the right rear wheel RWr be TTM2, the target motor base torques TTM1, TTM2 of the left first and right second motors 2A, 2B are calculated from the following equations (5), (6).

$$TTM1=(1/\text{Ratio})\cdot WTT1 \quad (5)$$

$$TTM2=(1/\text{Ratio})\cdot WTT2 \quad (6)$$

where Ratio denotes the reduction gear ratios of the first and second planetary gear type speed reducers 12A, 12B.

From the equations (4) to (6) above, the target motor base torques TTM1, TTM2 of the first left and second right motors 2A, 2B are expressed by the following equations (7), (8).

$$TTM1=(1/\text{Ratio})\cdot \Delta TT/2 \quad (7)$$

$$TTM2=-(1/\text{Ratio})\cdot \Delta TT/2 \quad (8)$$

Consequently, the target torque difference ΔTT of the left and right rear wheels LWr, RWr is determined based on the target yaw moment YMT of the vehicle 3, and a value resulting from dividing a torque which is half the target torque difference ΔTT by the reduction gear ratio of the first planetary gear type speed reducer 12A is referred to as the target motor base torque TTM1, TTM2 of the first and second motors 2A, 2B on which the target torque control is performed, whereby a desired yaw moment can be generated.

<Target Rotation Number Control>

In the ring free state, that is, in such a state that the one-way clutch 50 is disengaged and the hydraulic brakes 60A, 60B are released, even though torques are generated from the first and second motors 2A, 2B in the same direction, since the ring gears 24A, 24B which are connected together are not locked and the aforesaid cancel of the motor torque distribution forces is not generated, no torque is transmitted to the rear wheels Wr, but only a variation in rotation number is generated in the sun gears 21A, 21B (the first and second motors 2A, 2B) and the ring gears 24A, 24B.

In this case, by generating the rotation control torques having the equal absolute values and acting in the same direction in the first and second motors 2A, 2B, the first motor 2A and/or the second motor 2B can be controlled to achieve the desired rotation number without transmitting the rotational control torques to the rear wheels Wr.

Figure 12B:
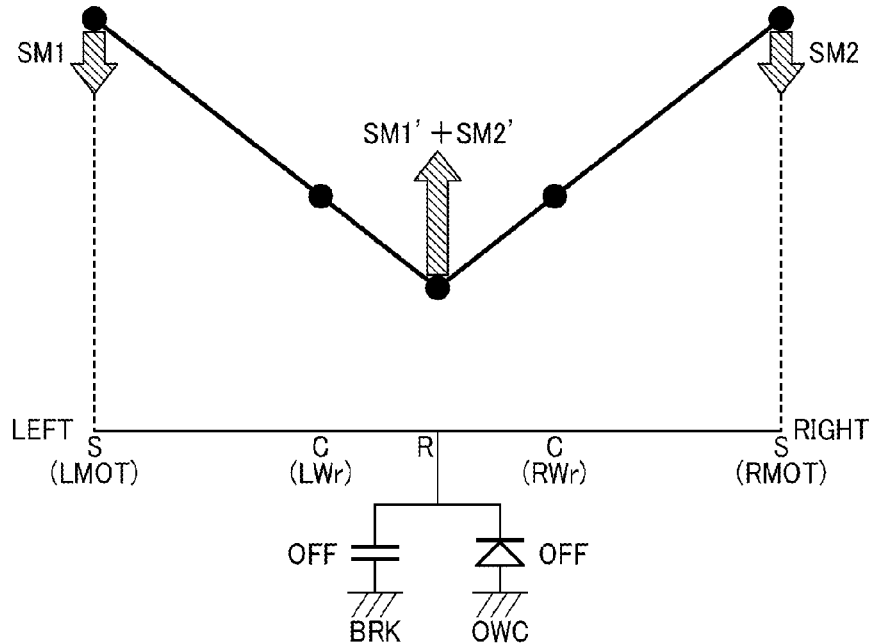
FIG. 12B is a velocity collinear diagram of the rear wheel driving system when the motors are controlled to attain their target rotation numbers while the vehicle is traveling at high vehicle speeds.
Figure 13:
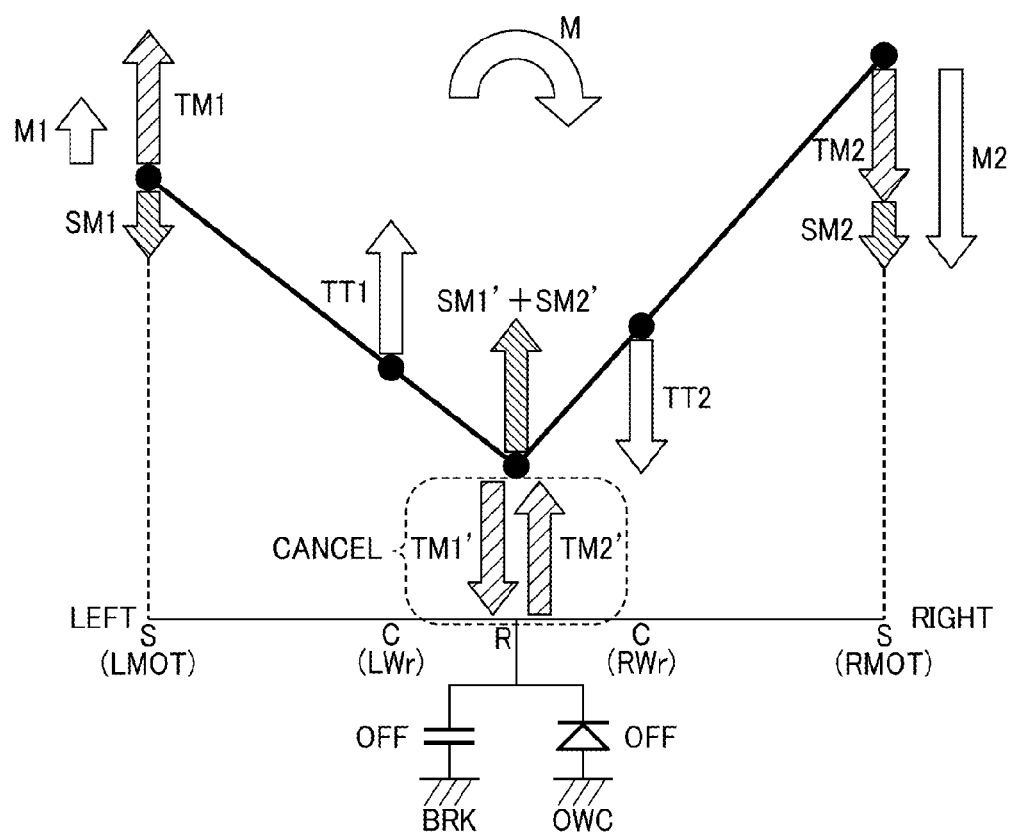
FIG. 13 is a velocity collinear diagram of the rear wheel driving system when the target torque control and the target rotation number control are performed simultaneously on the motors.

Referring to FIG. 12B, this will be described specifically by taking, for example, a case where the rotation numbers of the first and second motors 2A, 2B are reduced as an example. By executing a torque control on the first motor 2A so that a reverse first rotation control torque SM1 is generated therein, the reverse first rotation control torque SM1 acts on the sun gear 21A. At that time, as with the state shown in FIG. 9, a forward torque (not shown) which attempts to move the vehicle forwards is being applied to the planetary carrier 23A from the axle 10A. Consequently, in the first planetary gear type speed reducer 12A, as a result of the reverse first rotation control torque SM1 acting on the sun gear 21A which functions as a force point, with the planetary carrier 23A functioning as a support point, a forward first rotation control torque distribution force SM1' acts on the ring gears 24A, 24B which function as a action point.

Similarly, by executing a torque control on the second motor 2B so that a reverse second rotation control torque SM2 is generated therein, the reverse second rotation control torque SM2 acts on the sun gear 21B. At that time, as with the state shown in FIG. 9, a forward torque (not shown) which attempts to move the vehicle forwards is being applied to the planetary carrier 23B from the axle 10B. Consequently, in the second planetary gear type speed reducer 12B, as a result of the reverse second rotation control torque SM2 acting on the sun gear 21B which functions as a force point, with the planetary carrier 23B functioning as a support point, a forward second rotation control torque distribution force SM2' acts on the ring gears 24A, 24B which function as a action point.

Here, since the first and second rotation control torques SM1, SM2 are torques which have the equal absolute values and which act in the same direction, the first and second rotation control torque distribution forces SM1', SM2' which act on the ring gears 24A, 24B also become torques which have the equal absolute values and which act in the same direction, and the first and second rotation control torque distribution forces SM1', SM2' act in a direction in which the rotation number of the ring gears 24A, 24B are increased. At that time, since there exist no torques matching the first and second rotation control torques SM1, SM2 in the first and second planetary gear type speed reducers 12A, 12B, left and right rear wheel torques based on the first and second rotation control torques SM1, SM2 are not generated in the planetary carriers 23A, 23B. Consequently, the first and second rotation control torques SM1, SM2 only contribute to the variation in rotation and reduces the rotation numbers of the first and second motors 2A, 2B and the rotation numbers of the sun gears 21A, 21B, and the first and second rotation control torque distribution forces SM1', SM2' increase the rotation number of the ring gears 24A, 24B. In this way, by generating the first and second rotation control torques SM1, SM2 as required, the first and second motors 2A, 2B can be controlled to achieve arbitrary rotation numbers, and then, the first and second motors 2A, 2B achieve the target motor rotation numbers.

Due to the ring gears 24A, 24B being connected to each other, there are situations where the rear wheel driving system 1 cannot control the motor target rotation number of the first motor 2A and the motor target rotation number of the second motor 2B satisfactorily in a simultaneous fashion. In that case, a target rotation number control is performed on one of the motors so that the motor target rotation number of the one motor is satisfied.

<Target Torque Control+Target Rotation Number Control>

FIGS. 12A and 12B describe separately the target torque control in which the target torques are generated in the first and second motors 2A, 2B so as to generate the target yaw moment and the target rotation number control in which the first motor 2A and/or the second motor 2B is controlled so that the target rotation number is achieved therein. By executing both the target torque control and the target rotation number control at the same time, the first motor 2A and/or the second motor 2B can be controlled to achieve the desired rotation number while allowing the desired yaw moment to be generated.

FIGS. 13A to 13C are diagrams describing together the first and second motor base torques TM1, TM2 of the first and second motors 2A, 2B and the first and second motor base torque distribution forces TM1', TM2' which are the distribution forces of the first and second motor base torques TM1, TM2 which are shown in FIG. 12A, and the first and second rotation control torques SM1, SM2 and the first and second rotation control torque distribution forces SM1', SM2' which are the distribution forces of the first and second rotation control torques SM1, SM2 which are shown in FIG. 12B.

In this case, in reality, a forward first motor torque M1 (the first motor base torque TM1+the first rotation control torque SM1) is generated from the first motor 2A, and a reverse second motor torque M2 (the second motor base torque TM2+the second rotation control torque SM2) is generated from the second motor 2B, whereby a forward left rear wheel torque TT1 acts on the planetary carrier 23A, and a reverse right rear wheel torque TT2 acts on the planetary carrier 23B, generating a clockwise yaw moment M. Additionally, at the same time, the rotation numbers of the first and second motors 2A, 2B and the rotation numbers of the sun gears 21A, 21B are decreased, while the rotation number of the ring gears 24A, 24B is increased. Then, the first and second motors 2A, 2B achieve motor target rotation numbers.

As examples of cases where the target rotation speed control is performed, there will be described below three modes (I) to (III).

(I) A first mode is a mode in which the target rotation number control is performed based on the target rotation numbers of the motors or more particularly a mode in which the target rotation number control is performed based on the target rotation numbers of the motors which are based on the efficiencies of the motors. Namely, the first mode is a mode in which the motor target rotation numbers of the first and second motors 2A, 2B are set based on at least either the efficiencies of the first and second motors 2A, 2B or the efficiency of an electric power supply unit which supplies electric power to the motors. In such a state that the ring gears 24A, 24B are locked by the hydraulic brakes 60A, 60B and/or the one-way clutch 50, the rotation numbers of the first and second motors 2A, 2B and the rotation numbers of the sun gears 21A, 21B are linked with the rotations of the planetary carriers 23A, 23B and become predetermined rotation numbers which correspond to the reduction gear ratios of the first and second planetary gear type speed reducers 12A, 12B. On the other hand, in such a state that the ring gears 24A. 24B are not locked, that is, in the ring free state, the rotation numbers of the first and second motors 2A, 2B and the rotation numbers of the sun gears 21A, 21B are not linked with the rotations of the planetary carriers 23A, 23B and can be arbitrary rotation numbers. The electric power supply unit is a PDU which includes an inverter, not shown, or a three-phase line, and is mainly the PDU. In this way, by determining the motor target rotation numbers based on the efficiencies of the motors and the efficiency of the PDU which occupy largely the efficiency of the electric power supply system, the consumption of electric power can be reduced further. Additionally, the motor target rotation numbers may be determined based on only the efficiencies of the motors. In this case, when efficiencies are determined experimentally, an efficiency map can easily be prepared, while when efficiencies are determined through sequential detections and estimations, control quantities can be reduced.

Figure 14A:
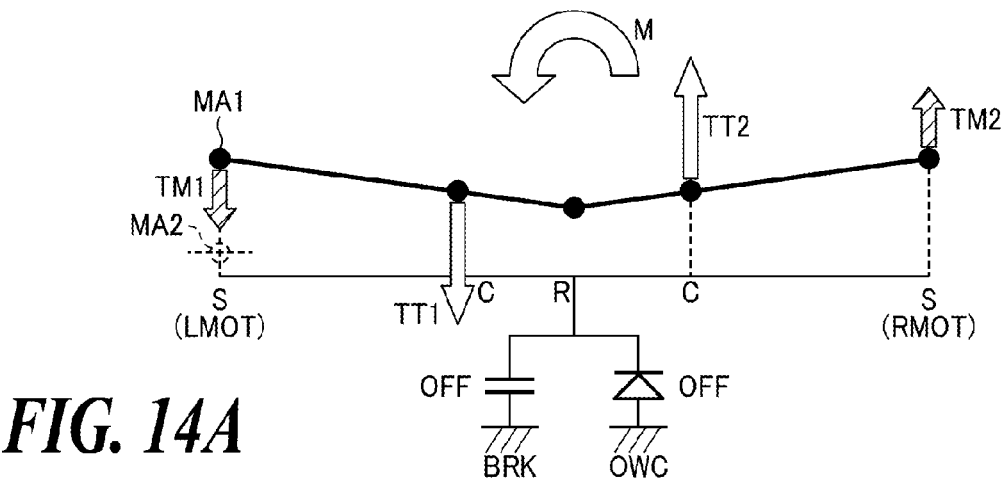
FIGS. 14A to 14C show time series velocity collinear diagrams of the rear wheel driving system when a target rotation number control is performed on the first motor based on a target rotation number of the first motor during the target torque control.
Figure 14B:
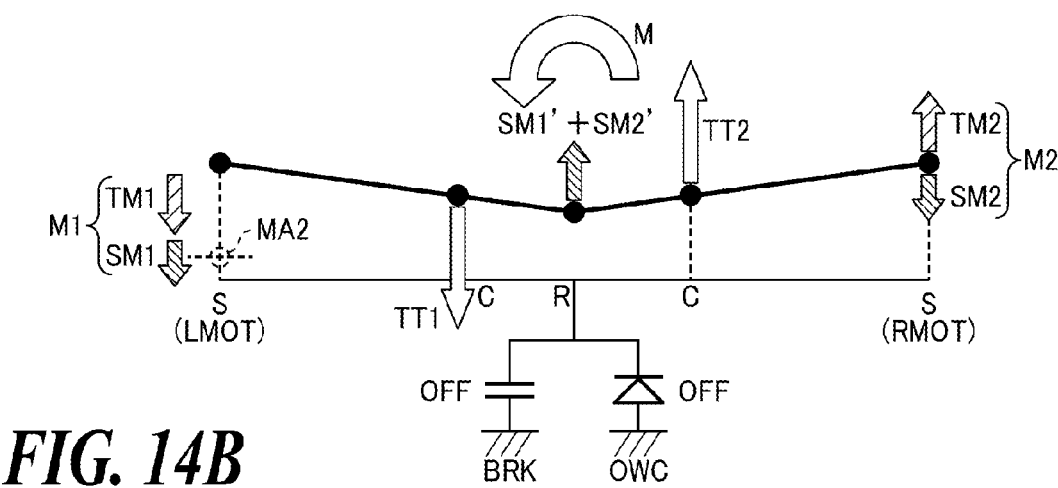

For example, in FIG. 14A, a reverse first motor base torque TM1 is generated from the first motor 2A, and a second motor base torque TM2 having an equal absolute value to that of the first motor base torque TM1 and acting in an opposite direction (a forward direction) to the direction in which the first motor base torque TM1 acts is generated from the second motor 2B, whereby a counterclockwise yaw moment M is generated. In this state, when the efficiency of the first motor 2A is better at a rotation number MA2 than at a current motor actual rotation number MA1, as shown in FIG. 14B, the motor target rotation number of the first motor 2A is set to MA2, and a reverse first rotation control torque SM1 which corresponds to a rotation number difference between the motor actual rotation number MA1 and the motor target rotation number MA2 is generated further in the first motor 2A, while a second rotation control torque SM2 having an equal absolute value to that of the first rotation control torque SM1 and acting in the same direction (a reverse direction) as the direction in which the first rotation control torque SM1 acts is generated further in the second motor 2B, as well.

Figure 14C:
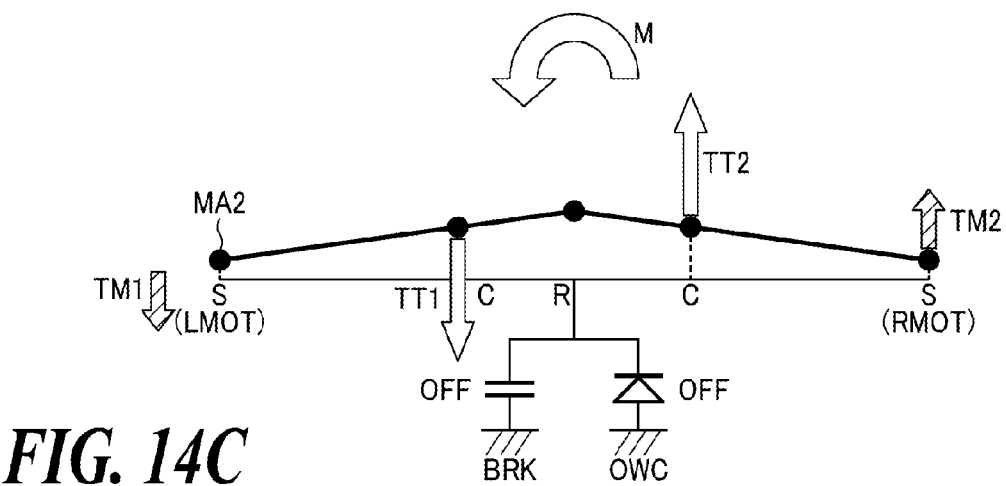

At that time, in reality, the first motor torque M1 (the first motor base torque TM1+the first rotation control torque SM1) is generated from the first motor 2A, and the second motor torque M2 (the second motor base torque TM2+the second rotation control torque SM2) is generated from the second motor 2B. Then, as shown in FIG. 14C, the first and second rotation control torques SM1, SM2 are made to disappear at a point in time when the motor actual rotation number MA1 of the first motor 2A is the motor target rotation number MA2. The rotation number of the second motor 2B and the rotation number of the sun gear 21B then are determined unambiguously by the rotation number of the planetary carrier 23B which is connected to the right rear wheel RWr and the rotation number of the ring gears 24A, 24B.

In this way, even in the ring free state, by setting the motor target rotation numbers of the motors based on the efficiencies of the motors or the like and adding the rotation control torques having the equal absolute values and acting in the same direction to both the motors in addition to the motor base torques, at least one of the motors can be controlled to achieve the desired rotation number which provides good efficiency while the desired yaw moment is allowed to be generated.

(II) A second mode is a mode in which the target rotation speed control is performed based on the target rotation number of the ring gears 24A, 24B and more particularly a mode in which the ring gears 24A, 24B are controlled to be in a zero rotation state (where the rotation numbers thereof become zero) when an application command of the hydraulic brakes 60A, 60B is inputted.

Figure 15A:
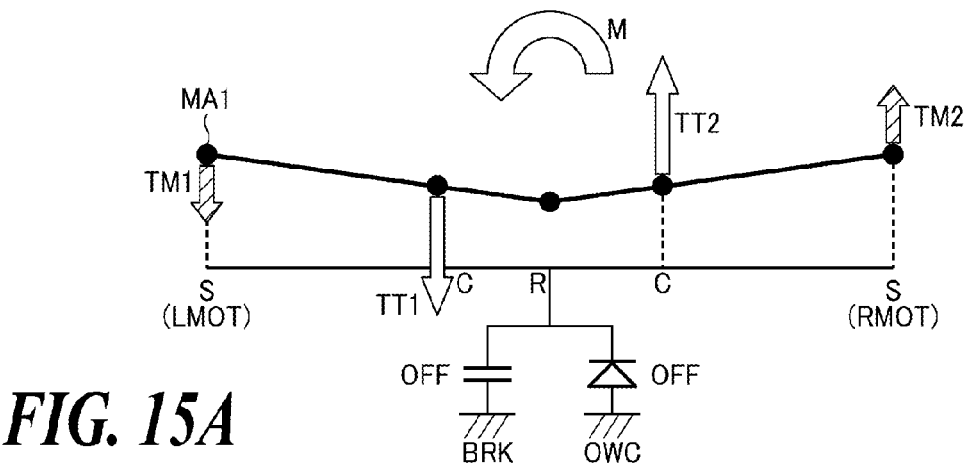
FIGS. 15A to 15C show time series velocity collinear diagrams of the rear wheel driving system when a target rotation number control is performed on the first motor based on a target rotation number of a ring gear during the target torque control.
Figure 15B:
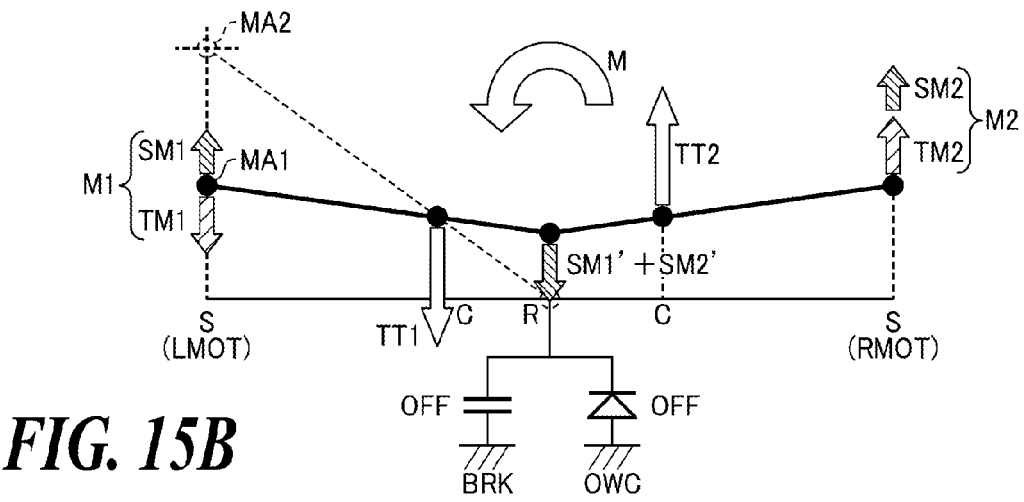

For example, in FIG. 15A, a reverse first motor base torque TM1 is generated from the first motor 2A, and a second motor base torque TM2 having an equal absolute value to that of the first motor base torque TM1 and acting in an opposite direction (a forward direction) to the direction in which the first motor base torque TM1 acts is generated from the second motor 2B, whereby a counterclockwise yaw moment M is generated. In this state, when an application command of the hydraulic brakes 60A, 60B is inputted, as shown in FIG. 15B, based on the assumption that the ring gears 24A, 24B are in the zero rotation state, MA2 which is the rotation number of the first motor 2A and which is determined based on the zero rotation of the ring gears 24A, 24B and the rotation number of the planetary carrier 23A or the rotation speed of the left rear wheel LW is set to the motor target rotation number, and a forward first rotation control torque SM1 which corresponds to a rotation number difference between the motor actual rotation number MA1 and the motor target rotation number MA2 is generated further in the first motor 2A, while a second rotation control torque SM2 having an equal absolute value to that of the first rotation control torque SM1 and acting in the same direction (a forward direction) as the direction in which the first rotation control torque SM1 acts is generated further in the second motor 2B, as well.

At that time, in reality, the first motor torque M1 (the first motor base torque TM1+the first rotation control torque SM1) is generated from the first motor 2A, and the second motor torque M2 (the second motor base torque TM2+the second rotation control torque SM2) is generated from the second motor 2B.

Figure 15C:
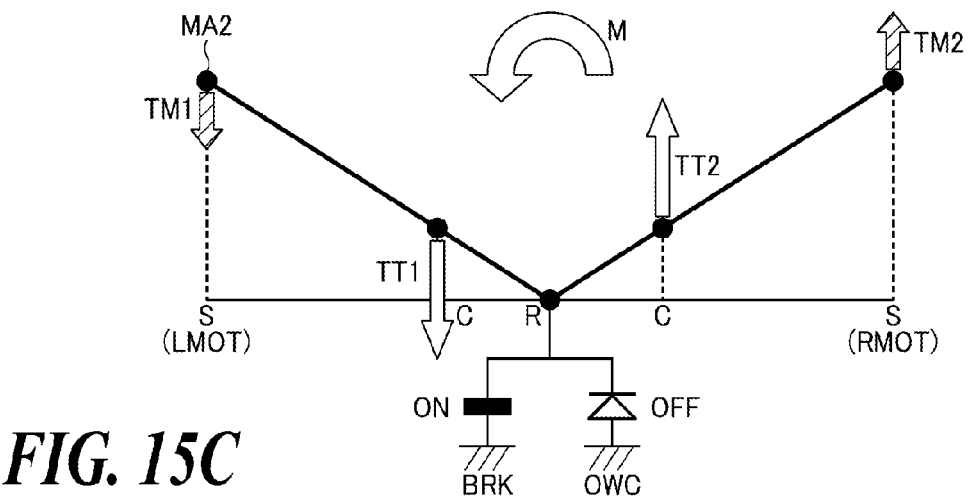

Then, as shown in FIG. 15C, the first and second rotation control torques SM1. SM2 are made to disappear at a point in time when the motor actual rotation number MA1 of the first motor 2A becomes the motor target rotation number MA2, and the hydraulic brakes 60A, 60B are applied. The rotation number of the second motor 2B and the rotation number of the sun gear 21B then are determined unambiguously by the rotation number of the planetary carrier 23B which is connected to the right rear wheel RWr and the rotation number of the ring gears 24A, 24B.

In this way, even in the ring free state, by setting the motor target rotation numbers of the motors based on the rotation number of the ring gears 24A, 24B and adding the rotation control torques having the equal absolute values and acting in the same direction to both the motors in addition to the motor base torques, at least one of the motors can be controlled to achieve the desired rotation number while the desired yaw moment is allowed to be generated. In the event that the target rotation number of the ring gears 24A, 24B are set to the zero rotation state in response to the input of the application command of the hydraulic brakes 60A, 60B as described above, it is possible to suppress a shock that is generated when the hydraulic brakes 60A, 60B are applied.

The execution of this control is not limited to the case where the target rotation number of the ring gears 24A, 24B is set to zero for the application of the hydraulic brakes 60A, 60B, and hence, the same control can also be performed when the ring gear target rotation number of the ring gears 24A, 24B is set to zero for engagement of the one-way clutch 50. In addition, in place of putting the ring gears 24A, 24B in the zero rotation state, the target rotation number of the ring gears 24A, 24B may be set to, for example, a desired rotation number at which the frictional loss is small.

(III) A third mode is a mode in which the target rotation number control is performed based on the target rotation numbers of the planetary gears 22A, 22B and more particularly a mode in which the planetary gears 22A, 22B are controlled so that their rotational directions are not reversed in the ring free state.

Figure 16A:
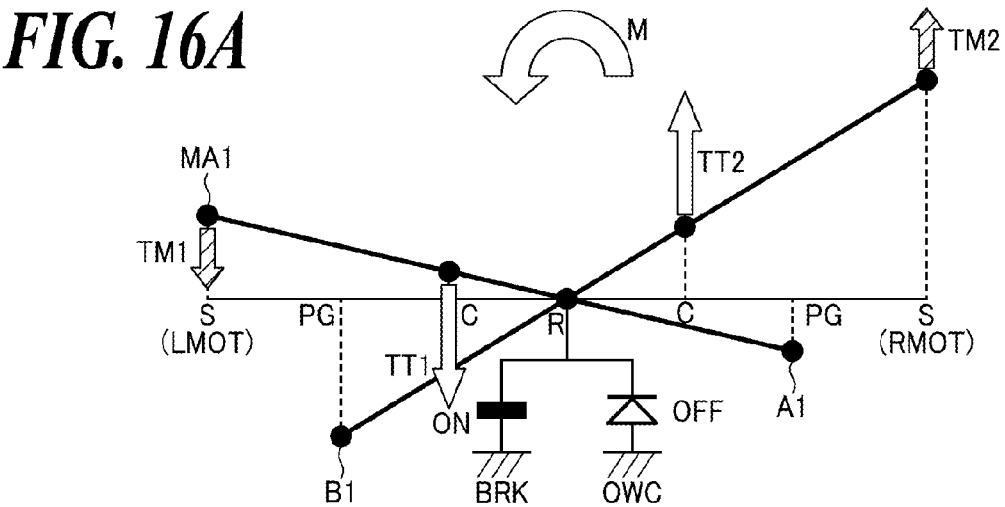
FIGS. 16A to 16C show time series velocity collinear diagrams of the rear wheel driving system when a target rotation number control is performed on the first motor based on a target rotation number of planetary gears during the target torque control.

In FIG. 16A, during left turning of the vehicle 3, that is, the rotation numbers of the sun gear 21B and the planetary carrier 23B of the second planetary gear type speed reducer 12B are larger than the rotation numbers of the sun gear 21A and the planetary carrier 23A of the first planetary gear type speed reducer 12A according to a rotation number difference between the left rear wheel LWr and the right rear wheel RWr. In the rear wheel driving system 1, in order to assist the vehicle 3 to turn, a reverse first motor base torque TM1 is generated from the first motor 2A, and a second motor base torque TM2 having an equal absolute value to that of the first motor base torque TM1 and acting in an opposite direction (a forward direction) to the direction in which the first motor base torque TM1 acts is generated from the second motor 2B, whereby a counterclockwise yaw moment M is generated.

In FIG. 16A, a point (A1) on an extension of a line which connects the sun gear 21A (S), the planetary carrier 23A (C), and the ring gear 24A (R) of the first planetary gear type speed reducer 12A represents a rotation number of the planetary gear 22A (when it rotates on its own axis), and a point (B1) on an extension of a line which connects the sun gear 21B (S), the planetary carrier 23B (C), and the ring gear 24B (R) of the second planetary gear type speed reducer 12B represents a rotation number of the planetary gear 22B (when it rotates on its own axis).

Figure 16B:
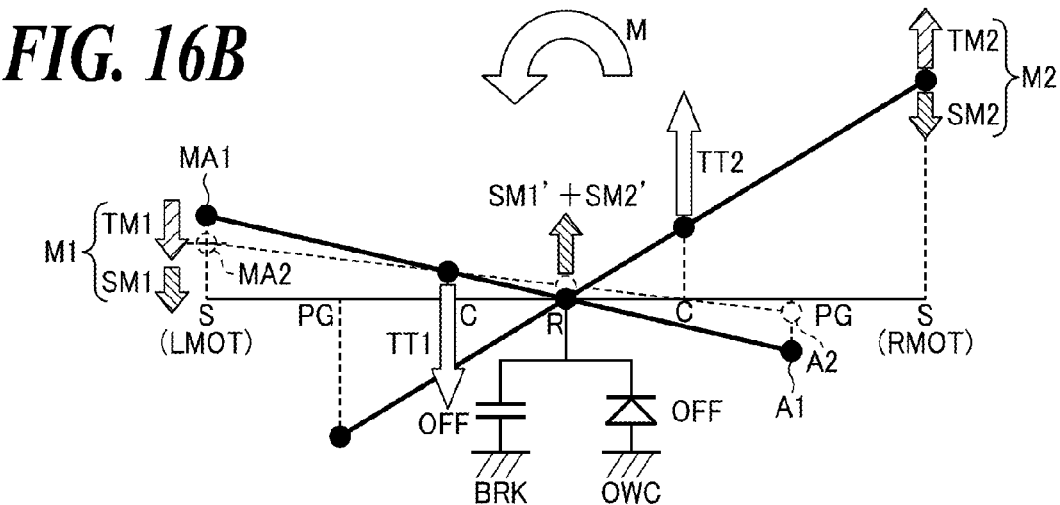

When the hydraulic brakes 60A, 60B are released from this state, the sun gears 21A, 21B (S), the planetary gears 22A, 22B (PG) and the ring gears 24A, 24B (R) other than the planetary carriers 23A, 23B (C) which are connected to the left rear wheel LWr and the right rear wheel RWr can be set to arbitrary rotation numbers. Here, when a release command of the hydraulic brakes 60A, 60B is inputted, as shown in FIG. 16B, a planetary gear target rotation number A2 is set to a rotation number in the vicinity of a zero rotation so that the rotational direction of the planetary gear 22A which is rotating reversely at the rotation number A1 is not reversed and that the rotation number (the absolute value) becomes small, and MA2 which is the rotation number of the first motor 2A and which is determined based on the planetary gear target rotation number A2 and the rotation number of the planetary carrier 23A is set to the motor target rotation number, and the hydraulic brakes 60A, 60B are controlled to be released. Additionally, a reverse first rotation control torque SM1 which corresponds to a rotation number difference between the motor actual rotation number MA1 and the motor target rotation number MA2 is generated further in the first motor 2A, and a second rotation control torque SM2 which has an equal absolute value to that of the first rotation control torque SM1 and which acts in the same direction (a reverse direction) as the direction in which the first rotation control torque SM1 acts is generated further in the second motor 2B, as well.

Figure 16C:
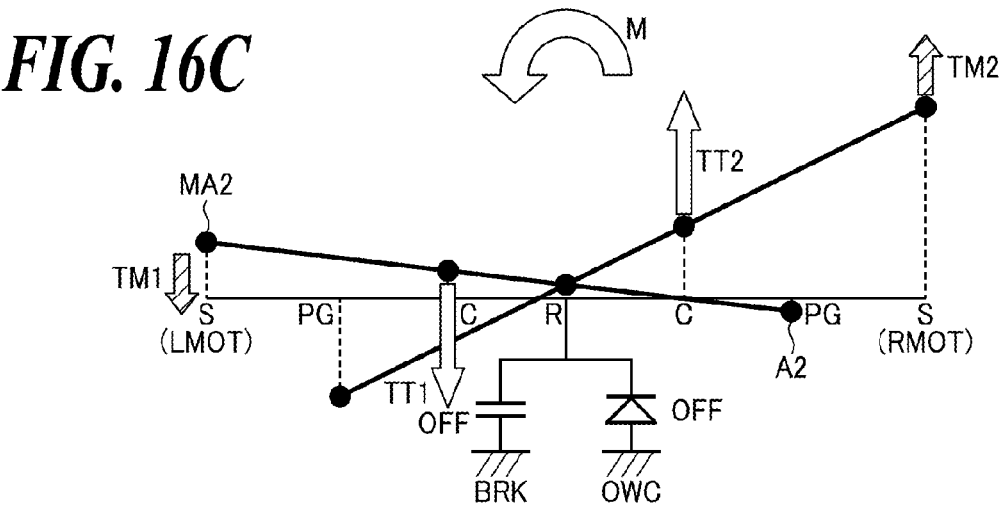

At that time, in reality, the first motor torque M1 (the first motor base torque TM1+the first rotation control torque SM1) is generated from the first motor 2A, and the second motor torque M2 (the second motor base torque TM2+the second rotation control torque SM2) is generated from the second motor 2B. Then, as shown in FIG. 16C, the first and second rotation control torques SM1, SM2 are made to disappear at a point in time when the motor actual rotation number MA1 of the first motor 2A becomes the motor target rotation number MA2. The rotation number of the second motor 2B and the rotation number of the sun gear 21B then are determined unambiguously by the rotation number of the planetary carrier 23B which is connected to the right rear wheel RWr and the rotation number of the ring gears 24A, 24B.

In this way, even in the ring free state, by setting the motor target rotation numbers of the motors based on the rotation numbers of the planetary gears 22A, 22B and adding the rotation control torques having the equal absolute values and acting in the same direction to both the motors in addition to the motor base torques, at least one of the motors can be controlled to achieve the desired rotation number while the desired yaw moment is allowed to be generated. As has been described above, in the event that the planetary gear target rotation numbers are set so that the rotational directions of the planetary gears 22A, 22B are not reversed, it is possible to prevent the disturbance of torque that would otherwise be generated in the rear wheels Wr by the backlash.

In addition, the calculation of the motor target rotation numbers described under (III) and the calculation of the motor target rotation numbers described under (I) may be performed in parallel. Namely, the calculation of the motor target rotation numbers based on the planetary gear target rotation numbers and the calculation of the motor target rotation numbers based on the efficiencies of the motors and the efficiency of the electric power supply unit which supplies electric power to the motors may be performed in parallel. This can reduce the consumption of electric power while preventing the generation of a backlash. However, when there exists no motor rotation numbers which satisfy simultaneously the motor target rotation numbers determined based on the planetary gear target rotation numbers and the motor target rotation numbers determined based on the efficiencies of the motors and the efficiency of the electric power supply unit which supplies electric power to the motors, it is preferable that priority is given to the motor target rotation numbers determined based on the planetary gear target rotation numbers. In this configuration, by causing the prevention of backlash generation to take priority over the efficiencies of the motors, the driving comfort of the vehicle can be enhanced.

Additionally, the calculation of the motor target rotation numbers described under (III) and the calculation of the motor target rotation numbers described under (II) may be performed in parallel. Namely, the calculation of the motor target rotation numbers based on the planetary gear target rotation numbers and the calculation of the motor target rotation numbers based on the ring gear target rotation number may be performed in parallel. This can prevent the occurrence of a shock when the hydraulic brakes 60A, 60B are applied or released while preventing the generation of a backlash. However, when there exists no motor rotation numbers which satisfy simultaneously the motor target rotation numbers determined based on the planetary gear target rotation numbers and the motor target rotation numbers determined based on the ring gear target rotation number, it is preferable that priority is given to the motor target rotation numbers determined based on the ring gear target rotation number. In this configuration, by causing the prevention of the occurrence of a shock when the hydraulic brakes 60A, 60B are applied or released to take priority over the prevention of backlash generation, the stability of the vehicle can be enhanced.

Figure 18:
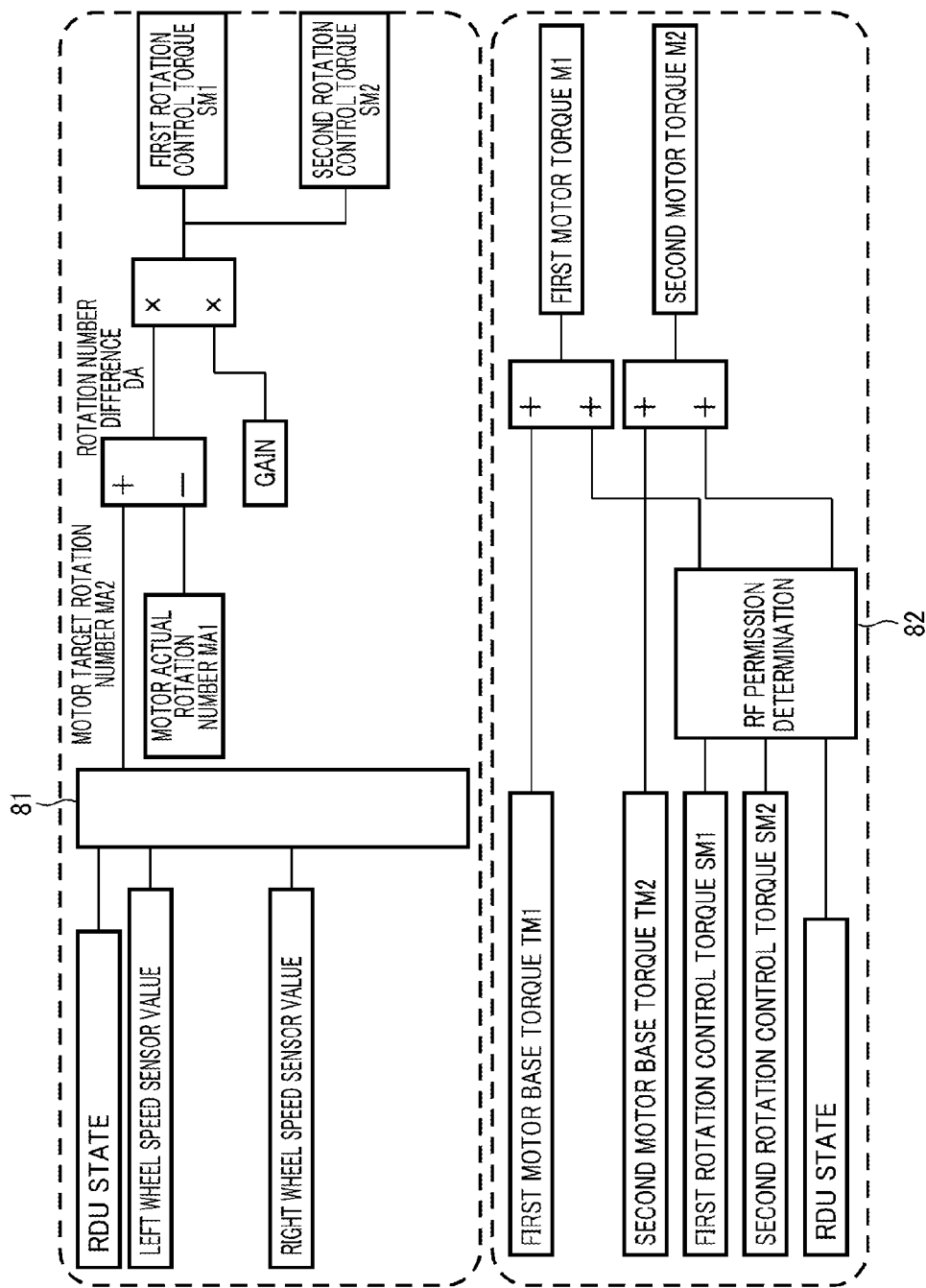
FIG. 18 is a block diagram describing a calculation logic in a ring free control.

FIG. 18 is a block diagram describing a calculation logic of first and second motor torques M1, M2.

Reference numeral 81 denotes a motor target rotation number setting module. A state (RDU STATE) of the rear wheel driving system 1, and a left wheel speed sensor value and a right wheel speed sensor value are inputted into the motor target rotation number setting module 81, and the motor target rotation number setting module 81 calculates the motor target rotation number MA2 of the first motor 2A as described in the modes (I) to (III) above according to control signals such as a rotation number change command based on the efficiencies of the motors, an application or release command of the ring gears 24A, 24B, a rotational direction reversing prevention command of the planetary gears 22A, 22B and the like. Then, the controller 8 calculates a rotation number difference DA by subtracting the motor actual rotation number MA1 which is the current rotation number of the first motor 2A from the motor target rotation number MA2 of the first motor 2A which is calculated. Then, the rotation number difference DA is multiplied by a predetermined gain to convert it into torque to thereby calculate a first rotation control torque SM1 of the first motor 2A and a second rotation control torque SM2 of the second motor 2B. The first and second control torques SM1, SM2 are torques having equal absolute values and acting in the same direction.

Reference numeral 82 denotes a ring free permission determination module. The state (RDU STATE) of the rear wheel driving system 1, and the first and second rotation control torques SM1, SM2 are inputted into the ring free permission determination module 82, whereby the ring free permission determination module 82 determines on whether to permit a ring free control. When the ring free control is permitted, a first motor torque M1 which is a torque to be generated in the first motor 2A is calculated by adding the first rotation control torque SM1 to the first motor base torque TM1 which is calculated in response to a yaw moment request. Similarly, a second motor torque M2 which is a torque to be generated in the second motor 2B is calculated by adding the second rotation control torque SM2 to the second motor base torque TM2 which is calculated in response to the yaw moment request.

Thus, as has been described heretofore, the rotation control torque is determined based on the rotation number difference between the motor target rotation number and the motor actual rotation number of one of the first motor 2A and the second motor 2B, and the first motor torque M1 of the first motor 2A and the second motor torque M2 of the second motor 2B are determined based on the rotation control torque, whereby even in the ring free state, at least one of the motors can be controlled to achieve the desired rotation number while allowing the desired yaw moment to be generated.

In the explanations of (I) to (III) in FIGS. 14A to 16C, the first motor 2A is described throughout the explanations as the motor which controls the target rotation number. In other words, in the modes (A) to (C) above, only the first motor 2A is described as the motor which has the motor target rotation number, while the second motor 2B is described as the motor which does not have the motor target rotation number. On the other hand, the second motor 2B may uniformly be selected so that only the second motor 2B is the motor which has the motor target rotation number, while the first motor 2A is the motor which does not have the motor target rotation number. Further, a configuration may be adopted in which both the first and second motors 2A, 2B have the motor target rotation numbers and one of the motors which has a smaller rotation number difference between motor target rotation number and motor actual rotation number is selected as the motor which executes the target rotation number control.

A case where one of the first motor 2A and the second motor 2B which has a smaller rotation number difference between motor target rotation number and motor actual rotation number is selected as the motor which executes the target rotation number control will be described based on the mode (III) above.

Figure 17:
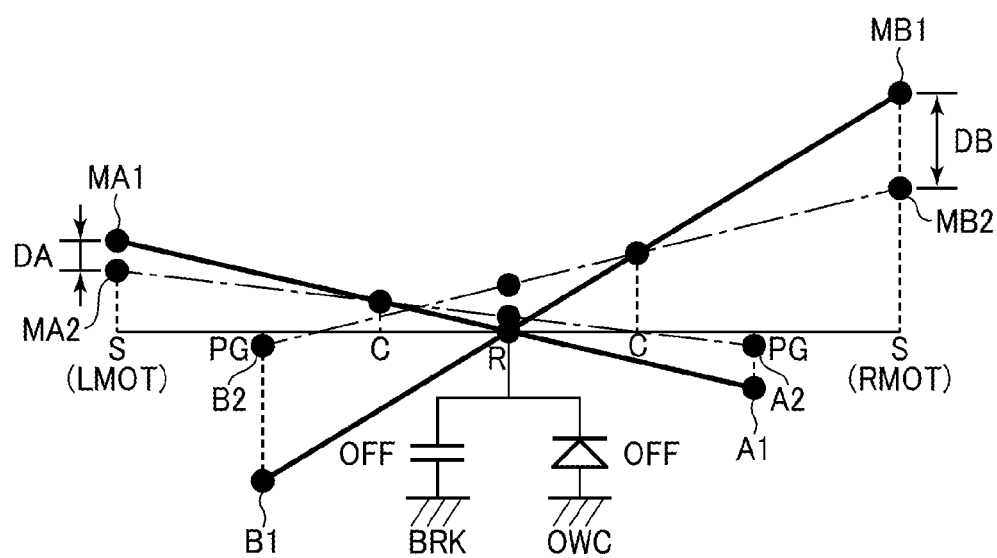
FIG. 17 is a velocity collinear diagram when a rotation number difference of the first motor and a rotation number difference of the second motor are different.

When a release command of the hydraulic brakes 60A, 60B is inputted, as shown in FIG. 17, a planetary gear target rotation number A2 is set to a rotation number in the vicinity of a zero rotation so that the rotational direction of the planetary gear 22A which is rotating reversely at the rotation number A1 in the first planetary gear type speed reducer 12A is not reversed and that the rotation number (the absolute value) becomes small, and a rotation number difference DA between the motor actual rotation number MA1 of the first motor 2A and the motor target rotation number MA2 of the first motor 2A which is determined based on the planetary gear target rotation number A2 and the rotation number of the planetary carrier 23A or the rotation number of the left rear wheel LWr is calculated. Similarly, a planetary gear target rotation number B2 is set to a rotation number in the vicinity of a zero rotation so that the rotational direction of the planetary gear 22B which is rotating reversely at the rotation number B1 in the second planetary gear type speed reducer 12B is not reversed and that the rotation number (the absolute value) becomes small, and a rotation number difference DB between the motor actual rotation number MB1 of the second motor 2B and the motor target rotation number MB2 of the second motor 2B which is determined based on the planetary gear target rotation number B2 and the rotation number of the planetary carrier 23B or the rotation number of the right rear wheel RWr is calculated. Then, the rotation number difference DA of the first motor 2A and the rotation number difference DB of the second motor 2B are compared, and the first motor 2A whose rotation number difference is smaller is selected as the motor which executes the target rotation number control. In this way, by selecting the motor whose rotation number difference is smaller as the motor which executes the target rotation number control, it is possible to suppress the excessive control of the motor whose rotation number difference is larger, that is, the motor which is not controlled to achieve the motor target rotation number. Should the second motor 2B which is the motor having the larger rotation number difference be selected as the motor which executes the target rotation number control, the first motor 2A whose rotation number difference is smaller is controlled excessively, the rotation number of the planetary gear 22A of the first planetary gear type speed reducer 12A exceeds the target rotation number and the rotational direction thereof is reversed so that the planetary gear 22A rotates forwards.

Figure 19:
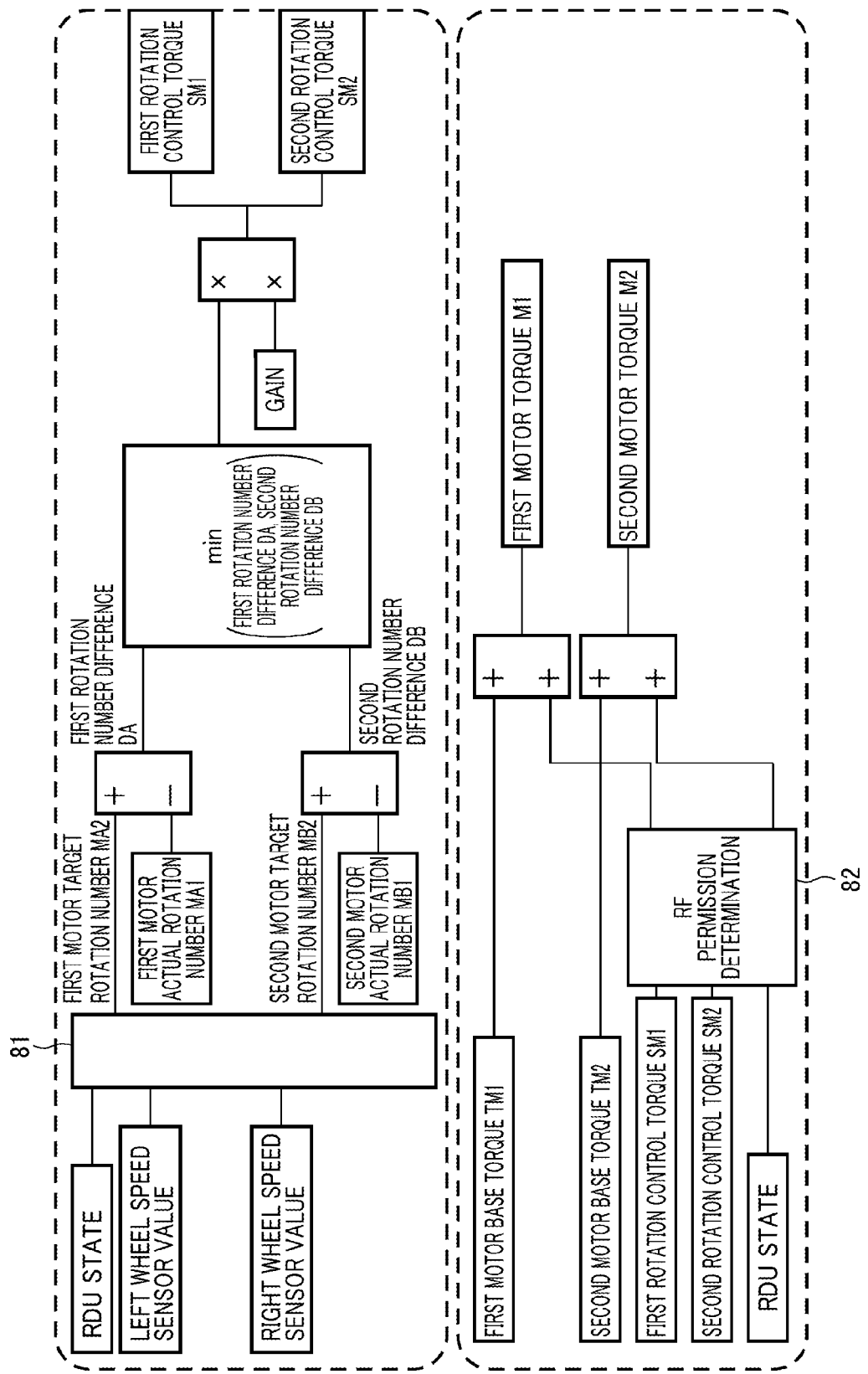
FIG. 19 is a block diagram describing another calculation logic in the ring free control.

FIG. 19 is a diagram describing a calculation logic of first and second motor torques M1, M2 in the case described above.

In the motor target rotation number setting module 81, a motor target rotation number of the first motor 2A (hereinafter, referred to as a first motor target rotation number MA2) and a motor target rotation number of the second motor 2B (hereinafter, referred to as a second motor target rotation number MB2) are calculated in response to the input of the control signals. Then, the controller 8 calculates a rotation number difference (hereinafter, referred to as a first rotation number difference DA) by subtracting the motor actual rotation number (hereinafter, referred to as a first motor actual rotation number MA1) which is the current rotation number of the first motor 2A from the first motor target rotation number MA2 of the first motor 2A which is calculated, and calculates a rotation number difference (hereinafter, referred to as a second rotation number difference DB) by subtracting the motor actual rotation number (hereinafter, referred to as a second motor actual rotation number MB1) which is the current rotation number of the second motor 2B from the second motor target rotation number MB2 of the second motor 2B which is calculated. Following this, the controller 8 compares the first rotation number difference DA and the second rotation number difference DB, and multiplies the rotation number difference of the motor whose rotation number difference is smaller by a predetermined gain to convert it into torque to thereby calculate a rotation control torque SM1 (hereinafter, referred to as a first rotation control torque SM1) of the first motor 2A and a rotation control torque SM2 (hereinafter, referred to as a second rotation control torque SM2) of the second motor 2B. The first and second rotation control torques SM1, SM2 are torques having equal absolute values and acting in the same direction.

Processes following this are the same as those described in FIG. 18, and therefore, the explanation thereof will be omitted here.

In FIG. 19, the first rotation number difference DA and the second rotation number difference DB are compared. However, a configuration shown in FIG. 20 may be adopted in which a first rotation control candidate torque which is the torque converted by multiplying the first rotation number difference DA by the predetermined gain and a second rotation control candidate torque which is the torque converted by multiplying the second rotation number difference DB by the predetermined gain are calculated, and thereafter, the first rotation control candidate torque and the second rotation control candidate torque are compared, whereby the rotation control candidate torque of the motor whose rotation control candidate torque is smaller is set to the first rotation control torque SM1 of the first motor 2A and the second rotation control torque SM2 of the second motor 2B.

Figure 20:
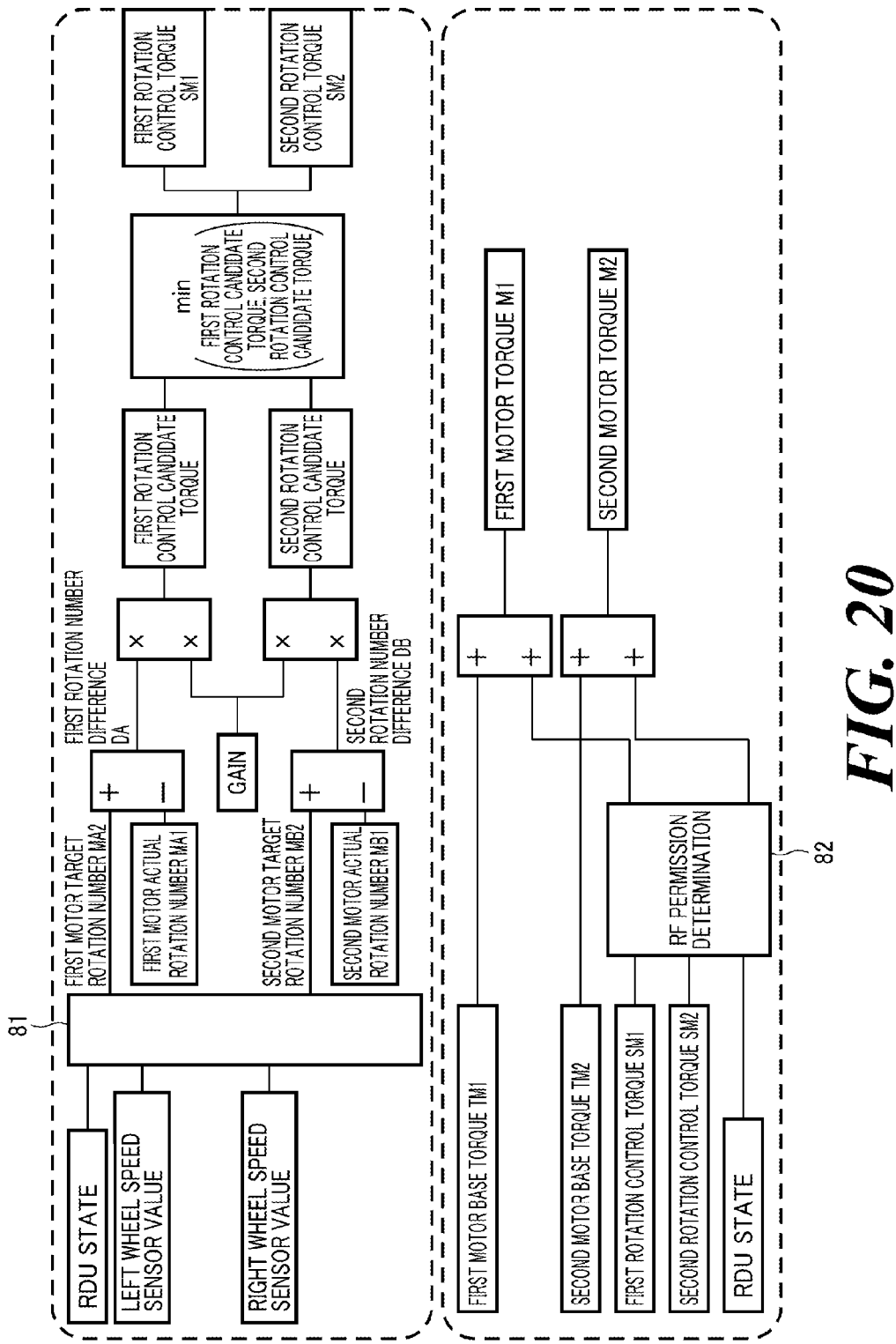
FIG. 20 is a block diagram describing further another calculation logic in the ring free control.

In FIGS. 18 to 20, in case the target rotation number control is not performed, the first and second rotation control torques SM1, SM2 are zero, and the first motor torque M1 equals the first motor base torque TM1, and the second motor torque M2 equals the second motor base torque TM2. The collinear diagram of the rear wheel driving system 1 then is the collinear diagram shown in FIG. 12A.

On the other hand, in case the target torque control is not performed, the first and second motor base torques TM1, TM2 are zero, and the first motor torque M1 equals the first rotation control torque SM1, while the second motor torque M2 equals the second rotation control torque SM2. The collinear diagram of the rear wheel driving system 1 then is the collinear diagram shown in FIG. 12B.

Thus, as has been described heretofore, according to this embodiment, the first and second rotation control torques SM1, SM2 are determined based on a smaller one of the first rotation number difference between the first motor target rotation number MA2 and the first motor actual rotation number MA1 of the first motor 2A and the second rotation number difference DB between the second motor target rotation number MB2 and the second motor actual rotation number MB1 of the second motor 2B, and then, the first motor torque M1 of the first motor 2A and the second motor torque M2 of the second motor 2B are determined based on the first and second rotation control torques SM1, SM2, or the first rotation control candidate torque is determined based on the first rotation number difference DA and the second rotation control candidate torque is determined based on the second rotation number difference DB, and then, the first motor torque M1 of the first motor 2A and the second motor torque M2 of the second motor 2B are determined based on a smaller one of the first and second rotation control candidate torques. Thus, even in the ring free state, the motor whose rotation number difference is smaller can be controlled further to achieve the desired rotation number while allowing the desired yaw moment to be generated. Additionally, by adding the rotation control torque determined based on the smaller rotation number difference to both the motors, it is possible to suppress the excessive control of the motor whose rotation number difference is larger.

The invention is not limited to the embodiment that has been described heretofore and hence can be modified and improved as required.

For example, the hydraulic brakes 60A, 60B do not have to be provided individually on the ring gears 24A, 24B, and hence, at least one hydraulic brake and one one-way clutch should be provided on the ring gears 24A, 24B which are connected together. Additionally, either the hydraulic brake or the one-way clutch or both may be omitted.

While the hydraulic brakes are described as functioning as an application/release unit, the invention is not limited thereto, and hence, any types of application/release unit can be selected, including mechanical and electromagnetic types.

Additionally, the first and second motors 2A, 2B are connected to the sun gears 21A, 21B and the ring gears are connected to each other. However, the invention is not limited to that configuration, and hence, a configuration may be adopted in which the sun gears are connected together and the first and second motors are connected to the ring gears.

In addition, the front wheel driving system may use only the motor as a sole driving source thereof without using the internal combustion engine.

This patent application is based on Japanese Patent Application (No. 2012-064075) filed on Mar. 21, 2012, the contents of which are incorporated herein by reference.

DESCRIPTION OF REFERENCE NUMERALS AND CHARACTERS

1 Rear wheel driving system
2A First motor
2B Second motor
8 Controller (motor controller)
12A First planetary gear type speed reducer (first speed changer)
12B Second planetary gear type speed reducer (second speed changer)
21A, 21B Sun gear (first rotational element)
22A, 22B Planetary gear (fourth rotational element)
23A, 23B Planetary carrier (second rotational element)
24A, 24B Ring gear (third rotational element)
50 One-way clutch (unidirectional rotation restricting unit)
60A, 60B Hydraulic brake (bidirectional rotation restricting unit)
LWr Left rear wheel (left wheel)
RWr Right rear wheel (right wheel).

The invention claimed is:

1. A vehicle driving system comprising:
a left wheel driving system having: a first motor which drives a left wheel of a vehicle; and a first speed changer which is provided on a power transmission path between the first motor and the left wheel;
a right wheel driving system having: a second motor which drives a right wheel of the vehicle; and a second speed changer which is provided on a power transmission path between the second motor and the right wheel; and
a motor controller which controls the first motor and the second motor, wherein:
the first and the second speed changers each has first to third rotational elements;
the first motor is connected to the first rotational element of the first speed changer;
the second motor is connected to the first rotational element of the second speed changer;
the left wheel is connected to the second rotational element of the first speed changer;
the right wheel is connected to the second rotational element of the second speed changer;
the third rotational element of the first speed changer and the third rotational element of the second speed changer are connected to each other; and
the motor controller:
obtains a target rotation state quantity of the first motor, an actual rotation state quantity of the first motor, a target rotation state quantity of the second motor, and an actual rotation state quantity of the second motor;
determines a first rotation state quantity difference which is a rotation state quantity difference between the target rotation state quantity of the first motor and the actual rotation state quantity of the first motor, and a second rotation state quantity difference which is a rotation state quantity difference between the target rotation state quantity of the second motor and the actual rotation state quantity of the second motor;
determines a rotation state quantity control torque based on a smaller one of the first rotation state quantity difference and the second rotation state quantity difference; and
determines a control torque of the first motor and a control torque of the second motor based on the rotation state quantity control torque.

2. The vehicle driving system according to claim 1, wherein the target rotation state quantity of the first motor or the second motor is determined based on at least one of an efficiency of the motor and an efficiency of an electric power supply unit which supplies electric power to the motor.

3. The vehicle driving system according to claim 1, wherein the target rotation state quantity of the first motor or the second motor is determined based on a target rotation state quantity of the third rotational elements.

4. The vehicle driving system according to claim 3, comprising at least one of a bidirectional rotation restricting unit which can be released or applied and which restricts a rotation of the third rotational elements in both directions by being applied, and a unidirectional rotation restricting unit which permits a rotation of the third rotational elements in one direction when it is disengaged and which restricts a rotation of the third rotational element in the other direction when it is engaged,
wherein when the third rotational elements are rotating, the target rotation state quantity of the third rotational elements is set so that the third rotational elements become a substantially zero rotating state.

5. The vehicle driving system according to claim 1, wherein:
the first and the second speed changers each has a fourth rotational element which is supported by the second rotational element to be capable of revolving and which meshes with the first rotational element and the third rotational element; and
the target rotation state quantity of the first motor or the second motor is determined based on a target rotation state quantity of the fourth rotational element.

6. The vehicle driving system according to claim 5, wherein the target rotation state quantity of the fourth rotational element is set so that a rotational direction of the fourth rotational element which is rotating in one direction or the other direction is not reversed.

7. The vehicle driving system according to claim 2, wherein the target rotation state quantity of the first motor or the second motor is determined further based on an actual rotation state quantity of the second rotational element, or an actual rotation state quantity of the left wheel or the right wheel.

8. The vehicle driving system according to claim 1, wherein:
target torque state quantities of the first motor and the second motor are determined based on a target turning state quantity of the vehicle;
a torque state quantity control torque of the first motor is determined based on the target torque state quantity of the first motor;
a torque state quantity control torque of the second motor is determined based on the target torque state quantity of the second motor; and
the control torque of the first motor and the control torque of the second motor are determined further based on the torque state quantity control torque of the first motor and the torque state quantity control torque of the second motor.

9. The vehicle driving system according to claim 8, wherein:
a target torque state quantity difference between the first motor and the second motor is determined based on the target turning state quantity of the vehicle;
one of the target torque state quantity of the first motor and the target torque state quantity of the second motor is determined as a torque state quantity which is half the target torque state quantity difference in magnitude and which has a positive sign; and
the other one of the target torque state quantity of the first motor and the target torque state quantity of the second motor is determined as a torque state quantity which is half the target torque state quantity difference in magnitude and which has a negative sign.

10. A control method for a vehicle driving system,
the vehicle driving system comprising:
a left wheel driving system having: a first motor which drives a left wheel of a vehicle; and a first speed changer which is provided on a power transmission path between the first motor and the left wheel;
a right wheel driving system having: a second motor which drives a right wheel of the vehicle; and a second speed changer which is provided on a power transmission path between the second motor and the right wheel; and
a motor controller which controls the first motor and the second motor, wherein:
the first and the second speed changers each has first to third rotational elements;

the first motor is connected to the first rotational element of the first speed changer;

the second motor is connected to the first rotational element of the second speed changer;

the left wheel is connected to the second rotational element of the first speed changer;

the right wheel is connected to the second rotational element of the second speed changer; and the third rotational element of the first speed changer and the third rotational element of the second speed changer are connected to each other, the control method comprising:

a process of obtaining a target rotation state quantity of the first motor, an actual rotation state quantity of the first motor, a target rotation state quantity of the second motor, and an actual rotation state quantity of the second motor;

a process of determining a first rotation state quantity difference which is a rotation state quantity difference between the target rotation state quantity of the first motor and the actual rotation state quantity of the first motor, and a second rotation state quantity difference which is a rotation state quantity difference between the target rotation state quantity of the second motor and the actual rotation state quantity of the second motor;

a process of determining a rotation state quantity control torque based on a smaller one of the first rotation state quantity difference and the second rotation state quantity difference; and a process of determining a control torque of the first motor and a control torque of the second motor based on the rotation state quantity control torque.

11. The control method for a vehicle driving system according to claim 10, wherein the target rotation state quantity of the first motor or the second motor is determined based on at least one of an efficiency of the motor and an efficiency of an electric power supply unit which supplies electric power to the motor.

12. The control method for a vehicle driving system according to claim 10, wherein the target rotation state quantity of the first motor or the second motor is determined based on a target rotation state quantity of the third rotational elements.

13. The control method for a vehicle driving system according to claim 12, wherein:

the vehicle driving system includes at least one of a bidirectional rotation restricting unit which can be released or applied and which restricts a rotation of the third rotational elements in both directions by being applied, and a unidirectional rotation restricting unit which permits a rotation of the third rotational elements in one direction when it is disengaged, and which restricts a rotation of the third rotational element in the other direction when it is engaged; and when the third rotational elements are rotating, the target rotation state quantity of the third rotational elements is set so that the third rotational elements become a substantially zero rotating state.

14. The control method for a vehicle driving system according to claim 10, wherein:

the first and the second speed changers each has a fourth rotational element which is supported by the second rotational element so as to be capable of revolving and which meshes with the first rotational element and the third rotational element; and the target rotation state quantity of the first motor or the second motor is determined based on a target rotation state quantity of the fourth rotational element.

15. The control method for a vehicle driving system according to claim 14, wherein the target rotation state quantity of the fourth rotational element is set so that a rotational direction of the fourth rotational element which is rotating in one direction or the other direction is not reversed.

16. The control method for a vehicle driving system according to claim 11, wherein the target rotation state quantity of the first motor or the second motor is determined further based on an actual rotation state quantity of the second rotational element, or an actual rotation state quantity of the left wheel or the right wheel.

17. The control method for a vehicle driving system according to claim 10, wherein:

target torque state quantities of the first motor and the second motor are determined based on a target turning state quantity of the vehicle;

a torque state quantity control torque of the first motor is determined based on the target torque state quantity of the first motor;

a torque state quantity control torque of the second motor is determined based on the target torque state quantity of the second motor; and the control torque of the first motor and the control torque of the second motor are determined further based on the torque state quantity control torque of the first motor and the torque state quantity control torque of the second motor.

18. The control method for a vehicle driving system according to claim 17, wherein:

a target torque state quantity difference between the first motor and the second motor is determined based on the target turning state quantity of the vehicle;

one of the target torque state quantity of the first motor and the target torque state quantity of the second motor is determined as a torque state quantity which is half the target torque state quantity difference in magnitude and which has a positive sign; and the other one of the target torque state quantity of the first motor and the target torque state quantity of the second motor is determined as a torque state quantity which is half the target torque state quantity difference in magnitude and which has a negative sign.

19. A vehicle driving system comprising:

a left wheel driving system having: a first motor which drives a left wheel of a vehicle; and a first speed changer which is provided on a power transmission path between the first motor and the left wheel;

a right wheel driving system having: a second motor which drives a right wheel of the vehicle; and a second speed changer which is provided on a power transmission path between the second motor and the right wheel; and a motor controller which controls the first motor and the second motor, wherein:

the first and the second speed changers each has first to third rotational elements;

the first motor is connected to the first rotational element of the first speed changer;

the second motor is connected to the first rotational element of the second speed changer;

the left wheel is connected to the second rotational element of the first speed changer;

the right wheel is connected to the second rotational element of the second speed changer;

the third rotational element of the first speed changer and the third rotational element of the second speed changer are connected to each other; and the motor controller:

obtains a target rotation state quantity of the first motor, an actual rotation state quantity of the first motor, a target rotation state quantity of the second motor, and an actual rotation state quantity of the second motor;

determines a first rotation state quantity difference which is a rotation state quantity difference between the target rotation state quantity of the first motor and the actual rotation state quantity of the first motor, and a second rotation state quantity difference which is a rotation state quantity difference between the target rotation state quantity of the second motor and the actual rotation state quantity of the second motor;

determines a first rotation state quantity control torque based on the first rotation state quantity difference;

determines a second rotation state quantity control torque based on the second rotation state quantity difference; and determines a control torque of the first motor and a control torque of the second motor based on a smaller one of the first rotation state quantity control torque and the second rotation state quantity control torque.

20. A control method for a vehicle driving system, the vehicle driving system comprising:

a left wheel driving system having: a first motor which drives a left wheel of a vehicle; and a first speed changer which is provided on a power transmission path between the first motor and the left wheel, a right wheel driving system having: a second motor which drives a right wheel of the vehicle; and a second speed changer which is provided on a power transmission path between the second motor and the right wheel; and a motor controller which controls the first motor and the second motor, wherein:

the first and the second speed changers each has first to third rotational elements;

the first motor is connected to the first rotational element of the first speed changer;

the second motor is connected to the first rotational element of the second speed changer;

the left wheel is connected to the second rotational element of the first speed changer;

the right wheel is connected to the second rotational element of the second speed changer; and the third rotational element of the first speed changer and the third rotational element of the second speed changer are connected to each other, the control method comprising:

a process of obtaining a target rotation state quantity of the first motor, an actual rotation state quantity of the first motor, a target rotation state quantity of the second motor, and an actual rotation state quantity of the second motor;

a process of determining a first rotation state quantity difference which is a rotation state quantity difference between the target rotation state quantity of the first motor and the actual rotation state quantity of the first motor, and a second rotation state quantity difference which is a rotation state quantity difference between the target rotation state quantity of the second motor and the actual rotation state quantity of the second motor;

a process of determining a first rotation state quantity control torque based on the first rotation state quantity difference, and determining a second rotation state quantity control torque based on the second rotation state quantity difference; and a process of determining a control torque of the first motor and a control torque of the second motor based on a smaller one of the first rotation state quantity control torque and the second rotation state quantity control torque.

* * * * *